US012559040B2

(12) United States Patent
Huang

(10) Patent No.: US 12,559,040 B2
(45) Date of Patent: Feb. 24, 2026

(54) HIGH STRENGTH ADJUSTABLE AUTOMOTIVE CROSS BAR CARGO CARRIER

(71) Applicant: Jason Huang, Oakland Gardens, NY (US)

(72) Inventor: Jason Huang, Oakland Gardens, NY (US)

( * ) Notice: Subject to any disclaimer, the term of this patent is extended or adjusted under 35 U.S.C. 154(b) by 58 days.

(21) Appl. No.: 18/445,945

(22) Filed: Apr. 7, 2024

(65) Prior Publication Data

US 2025/0313156 A1     Oct. 9, 2025

(51) Int. Cl.
| | |
| --- | --- |
| B60R 9/00 | (2006.01) |
| B60R 9/045 | (2006.01) |
| B60R 11/00 | (2006.01) |

(52) U.S. Cl.
CPC ....... B60R 9/045 (2013.01); *B60R 2011/0085* (2013.01)

(58) Field of Classification Search
None
See application file for complete search history.

(56) References Cited

U.S. PATENT DOCUMENTS

| | | | | |
| --- | --- | --- | --- | --- |
| 4,372,469 A | * | 2/1983 | Kowalski | B60R 9/045 224/325 |
| 4,501,385 A | * | 2/1985 | Bott | B60R 9/045 224/325 |
| 4,588,117 A | * | 5/1986 | Bott | B60R 9/045 224/325 |
| 6,010,048 A | * | 1/2000 | Settelmayer | B60R 9/045 224/322 |
| 2021/0155165 A1 | * | 5/2021 | Larsson | B60R 9/045 |
| 2022/0161732 A1 | * | 5/2022 | Keck, II | B60R 9/058 |
| 2023/0256914 A1 | * | 8/2023 | Salsi | B60R 9/045 224/321 |

FOREIGN PATENT DOCUMENTS

| | | | | | |
| --- | --- | --- | --- | --- | --- |
| EP | | 3552881 A1 | * | 10/2019 | B60R 9/052 |
| WO | WO-2005035315 A1 | | * | 4/2005 | B60R 9/045 |

* cited by examiner

*Primary Examiner* — Steven M Marsh
(74) *Attorney, Agent, or Firm* — Richard L. Strauss, Esq.

(57) ABSTRACT

A high strength automotive cross bar cargo carrier is disclosed providing enhanced weight bearing capacity and cross bar height adjustment. The carrier provides greater weight capacity by utilizing a rib and groove system. The ribs and grooves cover a large surface areas and thereby efficiently distribute load stress. By eliminating dependence upon fasteners such as bolts and screws to bear cargo weight, the disclosed carrier provides dependable transportation of heavy cargo which might otherwise shear the usual fasteners currently utilized. The cargo carrier enables adjustment of a mounted cross bar's inboard/outboard position as well a enabling pivoting adjustment of a cross bar along a foe/aft arc. Continuous cross sectional cross bar configuration facilitates customization of cross bar length for varying roof widths.

22 Claims, 11 Drawing Sheets

HIGH STRENGTH ADJUSTABLE AUTOMOTIVE CROSS BAR CARGO CARRIER

TECHNICAL FIELD

The present invention concerns improvements in automotive roof top cargo carrier technology. More specifically, the disclosed invention concerns vehicular cross bar mounting devices which are designed to support heavy cargo placed upon such cross bars while also providing adjustment of cross bar height, length and rotational position.

BACKGROUND OF THE INVENTION

In the past, many automotive roof top cargo carriers have been disclosed which comprise several cross bars spanning a substantial portion of the width of the roofs they are mounted upon. Most commonly, a pair of opposing cross bar mounts, located at opposite ends of each such cross bars, are utilized as a means of mounting the cross bars to a vehicle roof. For this purpose, each of the opposing cross bar mounts are designed to engage roof top attachment features. Such roof top attachment features include smooth or threaded bores (which may be provided as individual or paired bores), roof flanges, roof channels and roof clips. Roof top attachment features are either prepared by the manufacturer of vehicles or prepared afterwards. Most often, these roof top attachment features are located in a linear array, adjacent to the right and left margins of a vehicle's roof. The roof top attachment features are most commonly also aligned with the longitudinal axis of the vehicle's roof which runs from the fore to the aft end of such roofs.

Prior art cross bar mounts have been provided in assorted heights so that cross bars, supported by such mounts, can be placed at a desired height over a roof which they traverse. For example, some vehicles have a relatively flat roof which does not include roof top vents, sun roofs or high curvature. For the purpose of mounting cross bars upon such a flat, obstruction-free roof, cross bar mounts of minimum height would provide sufficient roof clearance between the lowest surface of the cross bars and the surface of the vehicle roof. In other instances, a vehicle roof may include surface-mounted obstructions such as vents, sun roofs or, in some instances a great deal of curvature. In such instances, the prior art has provided roof top carriers which include cross bar mounts of greater height. The greater height of such cross bars mounts have been utilized in order to provide the increased clearance necessary for the cross bars mounted thereupon in order to sufficiently clear such roof top obstructions.

Vehicular roof top carriers of the past have mounted cross bars upon two opposing (right and left) cross bars by means of bolts, screws or similar fasteners. In such instances, the weight of each cross bar supported by an opposing pair of cross bar mounts, is born by such fasteners. These fasteners may and do fail when cross bars supported by such fasteners are subjected to heavy cargo and strong vibration. Such failures are due, in part, to the relatively small amount of surface area that is provided by such fasteners. It would be highly advantageous if a high strength cross bar mount and cross bars were disclosed which worked together to provide increased load-bearing capacity. It would be highly advantageous if such high strength cross bar mounts and cross bars would exhibit support and attachment means utilizing large surface areas so as to be able to resist the stress of heavy cargo loads and vibration. It would be still further advantageous if such high strength means of attachment did not depend only upon the strength of a fastener which, as mentioned above, could easily fail. It would be still further advantageous, if such a cross bar and cross a bar mount were disclosed which also provided adjustment of cross bar height.

SUMMARY OF THE INVENTION

Now in accordance with the present invention, a high strength cross bar cargo carrier is disclosed. The cargo carrier comprises a plurality of: adjustable cross bar mounts, adjustable cross bars, cross bar bushings and cross bar inserts. Fasteners are utilized to assemble as well as to attach the carrier to the roof of a vehicle such as a car, truck or van. The cross bar cargo carrier of the present invention incorporates an adjustable cross bar mount that bears the weight of cargo placed upon the cross bars utilizing horizontal ribs and grooves to distribute the weight load over a large surface area. By incorporating the aforementioned horizontal ribs and grooves, the adjustable cross bar mount provides the cross bar cargo carrier with increased load-bearing capacity and increased resistance to mechanical failure. In addition to increased load-bearing capacity, the cross bar mount of the present invention provides cross bar height adjustment. More specifically, adjustment of the height of two opposing adjustable cross bar mounts enables the height of a cross bar mounted upon such cross bar mounts to be adjusted in relation to the top surface of the roof. The height adjustment is utilized to provide clearance above the surface of a vehicle roof as well as any obstructions such as vents and other roof accessories. The adjustable cross bars of the present invention are affixed to the adjustable cross bar mounts utilizing cross bar inserts, cross bar alignment bushings and fasteners. The cross bar inserts, cross bar bushings and an insert channel enables adjustment of the cross bars inboard/outboard position as well as enabling the cross bar to be pivoted along an inboard/outboard arc. In addition, the cross bar inserts and cross bar bushings enable the adjustable cross bars to be pivoted along a fore/aft arc (as described in more detail, below)

The adjustable cross bar mounts of the present invention each includes a roof attachment section and a cross bar attachment section. The roof attachment section includes a lower portion and an upper portion. In preferred embodiments of the present invention, the lower portion of the roof attachment section is formed as rectangular tab having a top surface, a bottom surface, a fore end, an aft end, an outboard end and inboard end. In certain embodiments, the lower portion of the roof attachment section includes at least two roof attachment bores. They are located and positioned adjacently to the fore and aft ends of the lower section. However, it is preferred that the lower portion of the roof attachment include a fore bore, a central bore and an aft bore. As described in further detail, below, the bores formed through the lower portion of the roof attachment section are provided for the passage of roof mount fasteners such as, for example, machine screws, self-tapping screws, bolts, nuts and washers. The fasteners are utilized to affix the roof attachment section of the adjustable cross bar mount to roof attachment features. Such features are commonly formed in or upon a vehicle's roof adjacent to the right and left peripheral edges of the roof. The bottom surface of the lower portion of the roof attachment section is especially shaped so as to adapt to, for placement upon the surface of a vehicle's roof in these same peripheral areas. Although the lower portion of the roof attachment section may be formed in a flat rectangular shape, in certain preferred embodiments, the lower portion of the roof attachment section may have a curved shape. In such embodiments, the bottom surface of a curved lower portion of the roof attachments section has a concave shape. The concave shape of the bottom surface of the lower portion, in conjunction with the convex top surface of an elongated adjustment bushing utilized in certain preferred embodiments (discussed, below), enables the adjustable roof mount to compensate for inboard/outboard slope in peripheral areas of a vehicle's roof top surface.

The upper portion of the roof attachment section arises from, and is continuous with the inboard end of the lower portion. The upper portion of the roof attachment section includes an inboard surface, an outboard surface a superior end, an inferior end, a fore edge and an aft edge. The upper portion of the roof attachment section also includes a longitudinal axis running midway between and parallel with the fore and aft edges thereof. It is preferred that, as viewed with the lower surface of the lower portion of the roof attachment section affixed to a vehicle's roof, the upper section extends upward and slightly inboard relative to the surface of a vehicle's roof. More specifically, it is preferred that the angle formed at the intersection of the upper and lower portions of the roof attachment section, is from 100 to 120 degrees. It is further preferred that this angle be 110 25 degrees. The fore/aft width of the upper portion of the roof attachment section varies in certain preferred embodiments. In such embodiments, the width of the upper portion of the roof attachment section, at the inferior end, adjacent to its intersection with the lower portion, is greatest. In such embodiments, the width of the upper portion of the roof attachment section diminishes from inferior to the superior end.

In certain preferred embodiments of the present invention, the entire inboard and outboard surfaces of the upper portion of the roof attachment section include horizontal ribs and grooves traversing the complete width thereof and running from the fore to aft edges of the upper portion. In addition, a vertical height adjustment slot is located midway between the fore and aft edges of the upper portion of the roof attachment section. This location can also be described as coinciding with the longitudinal axis of the upper portion of the roof attachment section. The vertical height adjustment slot is so located in order to align with the assembly bores formed within the inboard and outboard plates bordering the roof attachment section capture flange (discussed below).

The cross bar attachment section of the adjustable cross bar mount comprises a cross bar support and a roof attachment section capture flange. A cross bar alignment bushing and a cross bar insert, discussed below, are utilized to attach the cross bar support to the cross bar. In preferred embodiments, the cross bar support is formed as a rectangular plate having a top surface, a bottom surface, an inboard end, an outboard end, an aft edge and a fore edge. Two, longitudinally aligned, grooves are formed within the top surface of the cross bar support. One longitudinal groove is located adjacent to the aft edge of the cross bar support while the second longitudinal groove is located adjacent to the fore edge of the support. These alignment grooves run from the outboard to the inboard ends of the cross bar support.

As mentioned above, the cross bar alignment bushing of the present invention provides, in part, adjustment of the position of the adjustable cross bar. The alignment bushing includes a top surface, a bottom surface and inboard end, an outboard end, a fore edge and an aft edge. In preferred embodiments, the cross bar alignment bushing is advantageously shaped in as a rectangular bar have a convex top surface and a flat bottom surface. The convex top surface of the alignment bushing has a radius of curvature equal to that of the concave bottom surface of the cross bar, discussed below. In addition, it is preferred that the bottom surface of the cross bar alignment bushing includes two longitudinally aligned ribs. One longitudinal rib is located adjacent to the fore edge of the alignment bushing, and the second bushing located adjacent to the aft edge of the alignment bushing. These longitudinally aligned ribs are especially shaped and configured to closely mate with longitudinal alignment grooves formed within the top surface of the cross bar support. A bore is located medially, between these longitudinal alignment grooves and midway between the inboard and outboard ends of the cross bar support. A corresponding bushing bore formed through the cross bar alignment bushing is located centrally between the fore and aft edges of the bushing and centrally between the inboard and outboard ends of the bushing is configured for alignment with the cross bar attachment bore formed through the cross bar support.

The roof attachment section capture flange includes and is formed by an inboard plate and an outboard plate. The inboard and outboard plates of the roof attachment section capture flange each include an outboard surface, an inboard surface, an inferior end, a superior end, a fore edge and an aft edge. The outboard plate arises from the outboard end of the cross bar support and the inboard plate arises from the bottom surface of the cross bar support. The inboard and outboard plates form the borders of the roof attachment section capture slot. The capture slot is, in fact, the space that lies between the inboard and outboard plates. These plates are located and positioned so as to enable passage of the upper portion of the roof attachment section between both plates and into the slot. The distance between the plates is especially arranged so that, although the upper portion of the roof attachment section can be positioned between the plates, the space is easily closed to provide firm capture of the upper portion, as described, in detail, below. Each of the inboard and outboard plate of the roof attachment section capture flange includes an assembly bore. The bores are located adjacent to the inferior ends of the plates and midway between the fore and aft edges thereof. It is preferred that the bore formed through the inboard plate be a threaded bore configured to mate with an assembly screw while the bore formed within the outboard plate be a smooth bore.

The inboard plate originates and extends in a downward and outboard direction from the bottom surface of the cross bar support. The outboard plate originates from the outboard end of the cross bar support and also extends downward and outboard (when the adjustable mount is attached to a vehicle roof in the manner described herein). It is preferred that the inboard and outboard plate of the roof attachment section capture flange originate from the cross bar support at an angle of from 100 degrees to 120 degrees. It is further preferred that they arise from the cross bar support at an angle of 110 degrees. It is especially preferred that the inboard and outboard plates which form the roof attachment section capture flange (and border the roof attachment section capture slot) each arise from the cross bar support at the same angle and at the same angle as the upper portion of the roof attachment segment arises from the lower portion of the roof attachment segment. In such embodiments, the inboard and outboard plates are devoid of curvature. In certain preferred embodiments, a superior portion of the inboard plate arising from the bottom surface of the cross bar support in a curved, rather than straight form. However, in such embodiments, another portion of the inboard plate, adjacent to the inferior end thereof, is formed in a straight configuration.

The inboard surface of the outboard plate includes horizontally disposed ribs and grooves running from the fore to aft edge of the outboard plate. The horizontally disposed ribs and grooves also run from the inferior the superior ends of the outboard plate. It is preferred that the outboard plate be devoid of curvature. As mentioned above, the inboard plate, in certain preferred embodiments, arises from the bottom surface of the cross bar support in a curved configuration. The curved configuration enables the inboard plate to arise further inboard along the cross bar support so as to provide greater stability to the cross bar. In such preferred embodiments, a portion of the inboard plate, adjacent to the inferior end thereof, is formed in a straight configuration, devoid of curvature. The outboard surface of this straight portion of the inboard plate is especially shaped and configured to include horizontal ribs and grooves running from the fore to aft edge of the inboard plate.

The horizontal ribs and grooves formed upon the inboard surface of the upper portion of the roof attachment section and the horizontal grooves and ribs formed upon the outboard surfaces of the inner plate of the roof attachment section capture flange are especially shaped and configured to tightly mate with one another upon engagement of an assembly fastener such as a machine screw, (discussed in more detail, below). In the same manner, the horizontal ribs and grooves formed upon the outboard surface of the upper portion of the roof attachment section and the horizontal grooves and ribs formed upon the inboard surface of the outer plate of the roof attachment section capture flange are also especially shaped and configured to tightly mate with one another upon tightening of the assembly fasteners.

The adjustable cross bar of the present invention is, in preferred embodiments, formed as an elongated bar having a top surface, a bottom surface, a fore surface, an aft surface, a right end and a left end. The length of the adjustable cross bar is the distance from the right to left end. The adjustable cross bar has a concave bottom surface. An attachment slot runs longitudinally along the center of the bottom surface. This attachment slot is positioned so as to align with the longitudinal axis of the cross bar and provide access to an insert channel located and running continuously through and within the lower portion of the cross bar. The insert channel includes a top wall, a bottom wall, a fore wall, and an aft wall. The insert channel also includes a width equal to the distance between the fore and aft wall. The bottom wall of the insert channel is effectively divided into two equal portions by the attachment slot. The top wall of the insert channel is concave while the bottom wall is convex. It is preferred that both the top concave and bottom convex walls of the insert channel (as view in cross section) have the same radius of curvature. It is still further preferred that the convex top surface of the alignment bushing, the concave bottom surface of the adjustable cross bar, the convex bottom wall of the insert channel, the concave bottom surface of the insert, the convex top surface of the insert and the concave top wall of the insert channel all demonstrate the same degree of curvature (and thus same radius of curvature). Such uniformity in curvature enables close mating between these surfaces as well as enabling the fore/aft pivoting adjustment along an arc discussed below.

The right and left ends of the cross bar are open and continuous with the open right and left ends of the insert channel. This configuration allows, as described below, access to the insert channel for insertion of the cross bar insert. It also enables inboard/outboard adjustment of the insert's position within the insert channel. The cross bar insert channel is especially configured so as to facilitate insertion of the cross bar insert therewith. In all embodiments, the cross bar insert channel runs the entire length of the cross bar. In preferred embodiments of the present invention, the cross bar insert channel is shaped and configured with sufficient width to enable the cross bar insert (which is designed and shaped to have a lesser width) to be adjusted along a fore/aft arc within the insert channel. For this purpose, the concave upper wall of the insert channel is shaped and configured to have a radius of curvature equal to the convex top surface of the cross bar insert. The convex shape of the bottom wall of the insert channel is shaped and configured to have a degree of curvature (measured as "a radius of curvature"), equal to that of the concave shape of the bottom surface of the cross bar insert.

The present invention also comprises cross bar inserts, cross bar alignment bushings, and fasteners utilized to assemble the adjustable cross bar mount of the present invention and to mount the adjustable cross bar thereupon. The cross bar insert is formed and shaped as a curved rectangular bar having a top surface, a bottom surface, a fore surface, an aft surface, an inboard end, an outboard end, a width and a longitudinal axis. The width of the insert is the distance between the fore and aft surface of the insert. The top surface of the cross bar insert is convex while the bottom surface is concave. In preferred embodiments of the present invention, the radius of curvature of the top convex surface of the cross bar insert is equal to the radius of curvature of the bottom concave surface of the insert.

The insert includes a central threaded bore. While contained within the cross bar insert channel, the convex top surface of the insert is shaped and configured to closely lie against and abut the concave top wall of the cross bar insert channel. The concave bottom surface of the insert is designed and configured to closely lie against and mate with the convex bottom wall of the insert channel. It is preferred that the bottom surface of the cross bar insert and the bottom wall of the insert channel and also demonstrates the same radius of curvature. In fact, it is preferred that the radius of curvature of the top wall of the insert channel, the top surface of the cross bar insert, the bottom surface of the cross bar insert, the bottom wall of the insert channel, the bottom surface of the cross bar and the top surface of the cross bar alignment bushing all be equal. It is preferred that the radius of curvature of all the aforementioned walls and surfaces to have a radius of curvature of from 52 to 62 millimeters. However it is still further preferred for the radius of curvature to be 57 millimeters. It is also preferred that the width of the cross bar insert not be equal to the width of the insert channel. An equal width would not enable the below-described fore/aft pivoting if the insert within the channel which, in turn, enables the fore/aft pivoting adjustment of the adjustable cross bar, discussed below. It is preferred that the width of the insert be from 10 to 40 percent less that the width of the cross bar insert channel. It is still further preferred that the width of the cross bar insert be from 20 to 30 percent less than the width of the cross bar insert channel. It is most preferred that the width of the cross bar insert be 25 percent less than the width of the cross bar insert channel. The reduced width of the cross bar insert in comparison to the width of the cross bar insert channel enables a cross bar insert positioned within the cross bar insert channel to pivot along a fore/aft arc. The fore/aft pivot of the cross bar insert enables the cross bar within which it is placed to also pivot along a fore/aft arc (as discussed in more detail, below).

The adjustable cross bar mount of the present invention is assembled by affixing a roof attachment section to a cross bar attachment section. For this purpose, the upper portion of the roof attachment section is first introduced into the roof attachment section capture slot located between the inboard plate and an outboard plate of the roof attachment section capture flange. The distance between these plates is especially dimensioned so that, although the upper portion of the roof attachment section can be inserted between the inboard and outboard plate forming the capture slot, the space is easily closed by an assembly screw to provide firm capture of the roof attachment section. As mentioned above, the entire inboard and outboard surfaces of the upper portion of the roof attachment section include horizontal ribs and grooves traversing the complete width thereof. These horizontal ribs and grooves are shaped and configured to mate with corresponding grooves and ribs formed upon the inboard surface of the outboard plate and outboard surface of the inboard plate of the roof attachment section capture slot. Once the upper portion of the roof attachment section has been placed at a desired height position within the roof attachment section capture slot, the roof attachment section can be firmly attached to the cross bar attachment section at a selected height. Height adjustment is accomplished by moving the cross bar attachment section upward or downward within the roof attachment capture slot until a desired position is attained. Therefore, a fastener such as, for example, a machine screw with a washer, is first introduced through the assembly bore formed through the outboard plate of the roof attachment capture slot. Thereafter, the machine screw or other suitable fastener is further introduced through the height adjustment slot formed longitudinally along the upper portion of the roof attachment section. Thereafter, the screw is introduced into the threaded assembly bore formed within the inboard plate of the roof attachment section capture flange. The height of the adjustable mount is adjusted by moving the cross bar attachment section upward and downward. Upon tightening of the machine screw, or other suitable fasteners, the horizontal ribs and grooves formed upon the inboard and outboard surfaces of the upper portion of the roof attachment section securely engage the horizontal ribs and grooves formed upon the inboard surface of the outboard plate and the outboard surface of the inboard plate (of the roof attachment section capture flange). Tightening of the machine screw thus securely attaches the roof attachment section to the cross bar attachment section to form a complete cross bar mount at a selected height.

The roof mount of the present invention can be easily attached to roof mounting features formed or prepared upon a vehicle roof. For example, vehicles commonly have longitudinally arranged roof mounting features located adjacent the right and left margins of the vehicle's roof. Such roof mounting vehicle include, for example, smooth bores, threaded bores, mounting channels and flanges. Some vehicles may position such roof mounting features in pairs such as, for example, pairs of threaded or smooth mounting bores. Other vehicles may arrange mounting features as single threaded or smooth bores or single clip nuts. The cross bar mount of the present invention provides a lower portion of the roof attachment having two, and in some instances, three bores for engagement of such roof features. It is preferred to configure the fore and aft bores of the lower portion of the roof attachment section in a square shape so as to allow for some inconsistencies in distances between paired roof features. Fastener, such as a machine screws, self-tapping screws, nuts, bolts and washers can be utilized to affix the roof attachment section of the present invention to a vehicle roof.

In order to mount an adjustable cross bar to a vehicle roof, two opposing (right and left) assembled adjustable cross bar mounts are required. The term "assembled adjustable cross bar mounts" as used throughout this specification and claims refers to a cross bar mount wherein the roof attachment section and the cross bar attachment section have been joined with a fastener as described above. For example, in mounting a cross bar to a vehicle roof, a first assembled adjustable cross bar mount of the present invention is affixed to a roof attachment feature located adjacent the right side of a vehicle roof. Thereafter, a second assembled adjustable roof mount is attached to a roof attachment feature located adjacent the left side of the vehicle roof in a fore/aft position directly opposite the first adjustable mount. Thereafter, a cross bar alignment bushing is placed upon the top surface of the cross bar support of both the right and left (opposing) adjustable cross bar mounts. The cross bar alignment bushings are positioned so that the longitudinal ribs formed upon the bottom surface of the bushings fit within the longitudinal grooves formed on the top surfaces of the cross bar supports upon which they are placed. In addition, the bushings are placed upon the cross bar supports so that the attachment bore formed through the cross bar support is aligned with the bushing bore formed through the bushing.

After the above-described placement of cross bar alignment bushings upon cross bar supports of opposing cross bar mounts, a cross bar insert is introduced through the right and left end of the cross bar into the insert channel. The insert is oriented within the insert channel so that the convex top surface of the insert is placed against the top concave wall of the insert channel. The bottom concave surface of the insert is placed against the bottom convex wall of the insert channel. A machine screw is introduced through the bottom surface of both cross bar supports through the attachment bore. The machine screw is then further inserted through the bushing bore of the alignment bushing. The machine screw is then further introduced through the longitudinal adjustment groove formed centrally, along through the bottom wall of the insert channel so as to engage the threaded central bore of the cross bar insert. The attachment bores formed through the cross bar support and the alignment bushing are both smooth bores allowing unobstructed passage of fasteners such as a machine bolt.

After initial introduction of a fastener, such as a machine screw, into the threaded bore of the cross bar insert, the screw is not tightened. This allows the insert to easily move in an inboard/outboard direction within the insert channel. The inboard/outboard position of the cross bar upon the vehicle roof can now be adjusted until the cross bars are centered upon the vehicle roof. In this position, a center point located half way between the right and left ends of the cross bar will be aligned with the longitudinal center of a vehicle roof upon which the cross bar is mounted. Thereafter, by tightening the machine screw, the concave bottom of the cross bar insert will be forced tightly against the convex bottom surface of the insert channel while the convex top surface of the alignment bushing will tighten against the concave bottom surface of the cross bar. Simultaneously, the flat bottom surface of the cross bar alignment bushing will become securely affixed to the cross bar support thereby firmly engaging and fixing the position of the cross bar. At this point, it is possible to adjust the height of the cross bar above the vehicle roof upon which it is mounted. For this purpose the assembly fastener, such as a machine screw and washer, which affixed the roof attachment section to the cross bar attachment section of the opposing cross bar mounts may be loosened. This allows the cross bar attachment section to be raised or lowered relative to the roof attachment section which is fixed in position (as it is mounted upon a vehicle mounting feature). This adjustment, in turn, enables the height of the cross bar, now attached to the cross bar attachment section of the cross bar mount, to be adjusted as desired. Tightening of the assembly screw after such adjustment will fix the cross bar at the desired height.

In certain situations, there may be a need to adjust the cross bars of the present invention in order to correct for a fore/aft slope of a vehicle roof. For this purpose, the adjustable cross bar mount and adjustable cross bar of the present invention enables the cross bar to be pivoted along a fore/aft arc. As mentioned above, the fore/aft width of the insert channel is greater than the width of the cross bar insert. In addition, the top wall of the insert channel is concave while the bottom wall is convex. The insert, conversely, has a convex upper surface and a concave bottom surface. Prior to tightening fasteners such as, for example, machine screws affixing a cross bar to two opposing cross bar mounts, the cross bar may be pivoted along a fore/aft arc. More specifically, prior to firmly tightening a machine screw that has engaged the threaded bore of the cross bar insert, the curved surfaces of the insert, insert channel, bottom surface of the cross bar and top surface of the cross bar alignment bushing enable such fore/aft pivoting. The greater width of the cross bar insert channel compared to the lesser width of the insert enables such a pivoting movement along a fore/aft arc. In preferred embodiments, the arc of movement corresponds to the radius of curvature of the top and bottom walls of the insert channel, the top and bottom surfaces of the cross bar insert and the top surface of the cross bar adjustment bushing. In such instances, after pivoting a cross bar to a desired position along this arc, tightening of the cross bar attachment screw into the threaded bore of the cross bar insert will fix the cross bar in this position.

The adjustable cross bar of the present invention has a continuous cross sectional configuration. The shape, dimensions and configuration of: the attachment slot, the insert channel, the concave bottom surfaces of the cross bar all are continuous throughout the entire length of the cross bar. This continuous cross sectional configuration enables the adjustable cross bar of the present invention to be cut at any desired length so as to traverse the distance between opposing (right and left) adjustable cross bar mounts on roofs of varying widths. The adjustable cross bar can therefore be customized as to length for a precise fit on varying vehicle roof widths.

The adjustable cross bar mount and adjustable cross bar of the present invention provide increased weight bearing capacity by substantially increasing the surface area of the weight bearing cross bar mount component. More specifically, the assembly bolt utilized to maintain the height of a cross bar mounted upon the roof mount, is not, in fact, a weight-bearing component. None of the fasteners utilized in the present invention are weight bearing. The assembly bolt utilized to affix the roof attachment section to the cross bar attachment section does not bear the weight carried by a cross bar. Instead, it causes the horizontal ribs and grooves formed upon the inboard and outboard surfaces of the upper portion of the roof attachment section to engage the horizontal ribs and grooves formed within the roof attachment section capture flange. Thus, the weight of a load placed upon the cross bar attached to such mounts is carried by numerous grooves and ridges having many times the surface area of a bolt, rivet or screw.

It is preferred that the adjustable cross bar mount and adjustable cross bar of the present invention be fabricated from a strong material such as metal or a plastic polymer. Metals such as galvanized steel, stainless steel, aluminum and aluminum alloys may be utilized as such materials. Alternatively, plastic polymers such as polycarbonate, polyethylene, polyvinylchloride and fiber reinforced plastic may be used to fabricate the adjustable cross bar mounts and adjustable cross bars of the present invention. It is preferred that fasteners utilized for assembly of the upper and lower portions of the adjustable cross bar mounts as well as fasteners utilized for securing the cross bar supports to the adjustable cross bars include machine screws and washers. Washers suitable for use as fasteners include, but are not limited to flat washers, square washers, split washers and lock washers. It is preferred that fasteners used in assembly and mounting of the cross bar carrier of the present invention be fabricated from metal such as zinc coated steel, galvanized steel, and aluminum alloys. It is still further preferred that the aforementioned fasteners be fabricated from stainless steel.

The alignment bushing, cross bar insert and elongated adjustment bushing (discussed, below) can also be fabricated of a metal material such as zinc coated steel, galvanized steel, stainless steel and aluminum alloys, it is preferred to fabricate such bushings and inserts from a plastic or rubber material. For example, a polytetrafluoroethylene, a polyether ketone, a polyamide or a polyurethane plastic. Alternatively, natural, styrene butadiene, nitrile butadiene or ethylene propylene diene monomer rubbers may be utilized. Such plastics and rubbers have superior vibration dampening qualities compared to metal materials. For this reason, they are preferred as the material utilized to fabricate the inserts and bushings utilized in the present invention.

BRIEF DESCRIPTION OF THE DRAWINGS

FIG. 6a is a front internal view of a segmented adjustable cross bar of the present invention mounted upon two opposing, (right and left), adjustable cross bar mounts.

FIG. 6b is a front external view of the segmented adjustable cross bar and a front internal view of the right and left (opposing) adjustable cross bar mounts illustrated in FIG. 6a.

DETAILED DESCRIPTION OF THE PREFERRED EMBODIMENT

Figure 1:
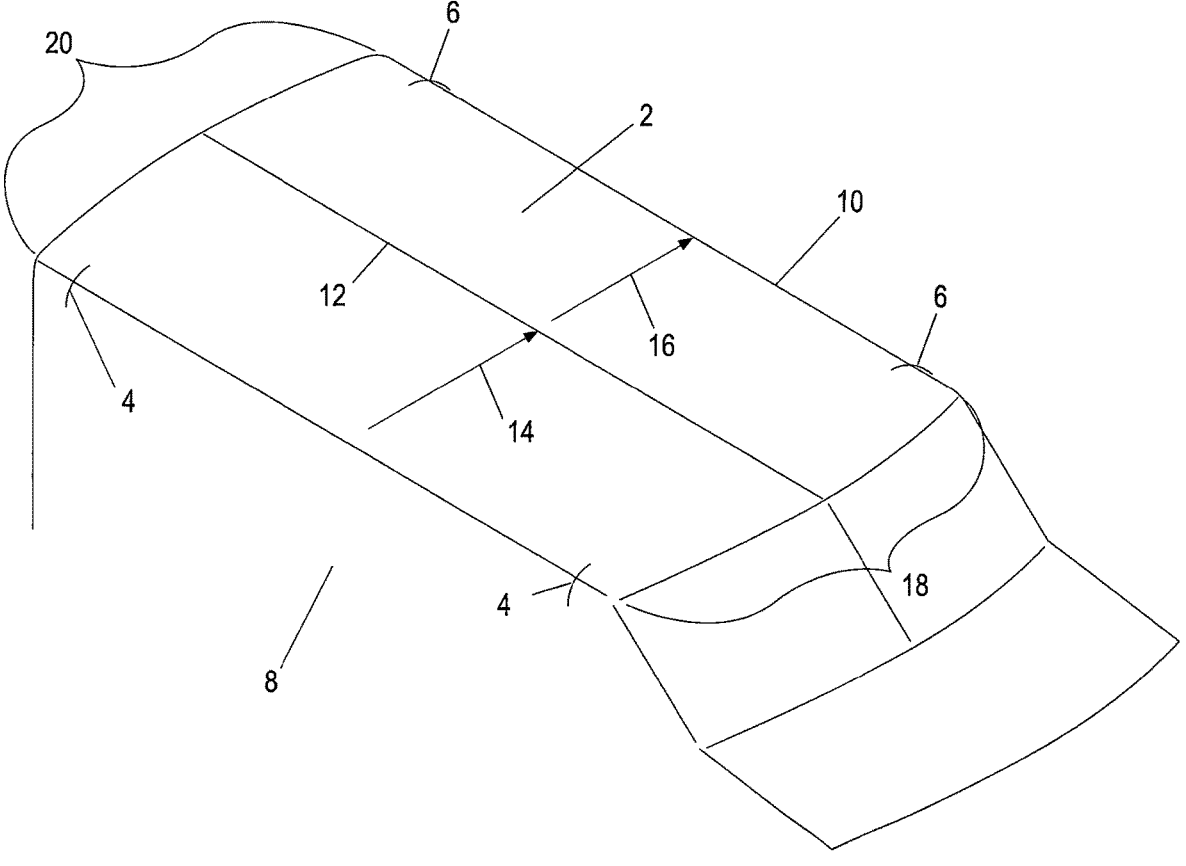
FIG. 1 is a top right isometric view of an automotive vehicle with directional indicators.
Figure 2:
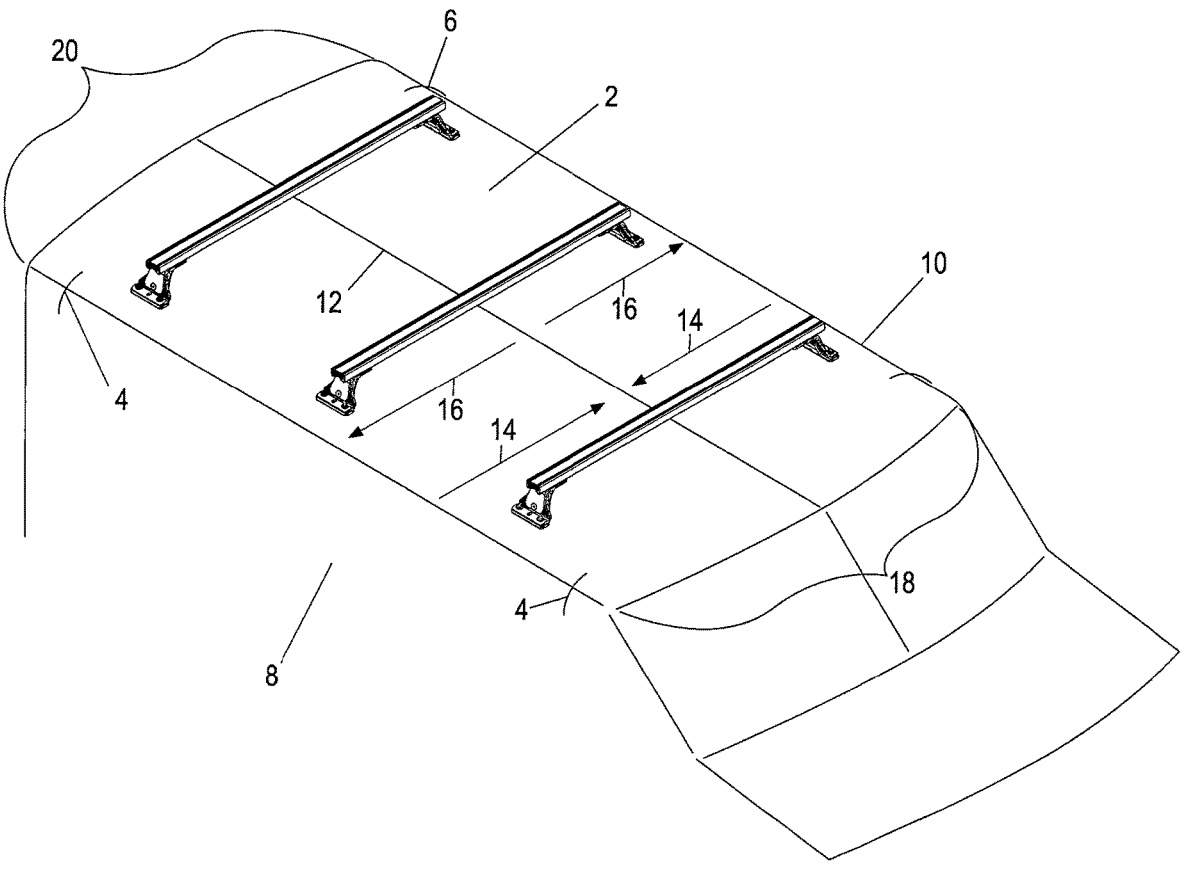
FIG. 2 illustrates the vehicle shown in FIG. 1 with three adjustable cross bars of the present invention each mounted upon opposing adjustable cross bar mounts.

For clarification of the relative direction and positions utilized herein to describe the orientation and position of various components of the high strength cross bar cargo carrier of the present invention as well as vehicle features, FIG. 1 is offered. The roof 2 of vehicles are described herein as having right 4 and left 6 peripheral margins (also referred to herein as right and left peripheral edges). For many vehicles, these marginal areas tend to curve downwards in an outboard direction 16 toward the right 8 and the left 10 sides of the vehicle. These areas of roof curvature are also described, with equal meaning herein, as having an "inboard/outboard slope", "outboard/inboard slope", "right outboard slope" and "left outboard slope." The longitudinal centerline 12 of a vehicle's roof forms the relative basis of the term inboard/outboard as utilized throughout this specification and claims. The term "inboard" 14 refers to a relative position moving toward, sloping toward or oriented toward the longitudinal centerline 12 of the vehicle roof. The term "outboard" 16 refers, to a relative position moving away from, sloping away from or oriented away from the longitudinal center of the vehicle roof. The term "fore", as used throughout this specification and claims, refers to a relative position moving toward, sloping toward or oriented toward the front 18 portion of a vehicle's roof. The term "aft" refers to, as used throughout this specification and claims, a relative position moving toward, sloping toward or oriented toward the rear 20 portion of a vehicle's roof. The term "fore/aft cant", "fore/aft slope" and "fore/aft pitch" as used throughout this specification all refers to the slope of a vehicle's roof running from the front to rear, or rear to front of a vehicle's roof.

The adjustable cross bar mount 1 of the present invention includes a roof attachment section 15 and a cross bar attachment section 57. The roof attachment section includes a lower portion 17 and an upper portion 33. In preferred embodiments of the present invention, the lower portion of the roof attachment section is formed as a flat rectangular tab having a top surface 21, a bottom surface 22, a fore end 23, an aft end 25, an outboard end 27 and an inboard end 29. (See FIG. 3) In alternate preferred embodiments, the lower portion of the roof attachment section is formed and shaped as a curved tab in order to accommodate an elongated adjustment bushing which corrects for inboard/outboard roof slope. In preferred embodiments, the lower portion of the roof attachment section includes at least two roof attachment bores. They are located and positioned adjacently to the fore and aft ends of the lower section. However, it is still further preferred that the lower portion of the roof attachment include a fore bore 24, a central bore 26 and an aft bore 28. (See FIG. 4a) As described in further detail, below, these bores, formed through the top and bottom surfaces of the lower portion of the roof attachment section, are provided for the passage of roof mount fasteners such as, for example, machine screws, self-tapping screws, bolts, nuts and washers. The fasteners are utilized to affix the roof attachment section of the adjustable cross bar mount to roof attachment features. Such features are commonly formed in a linear pattern upon a vehicle's roof adjacent to the right 4 and left 6 peripheral edges of the roof. The lower portion of the roof attachment section is especially shaped so as to adapt to the surface of a vehicle's roof in these same peripheral areas.

Figure 10A:
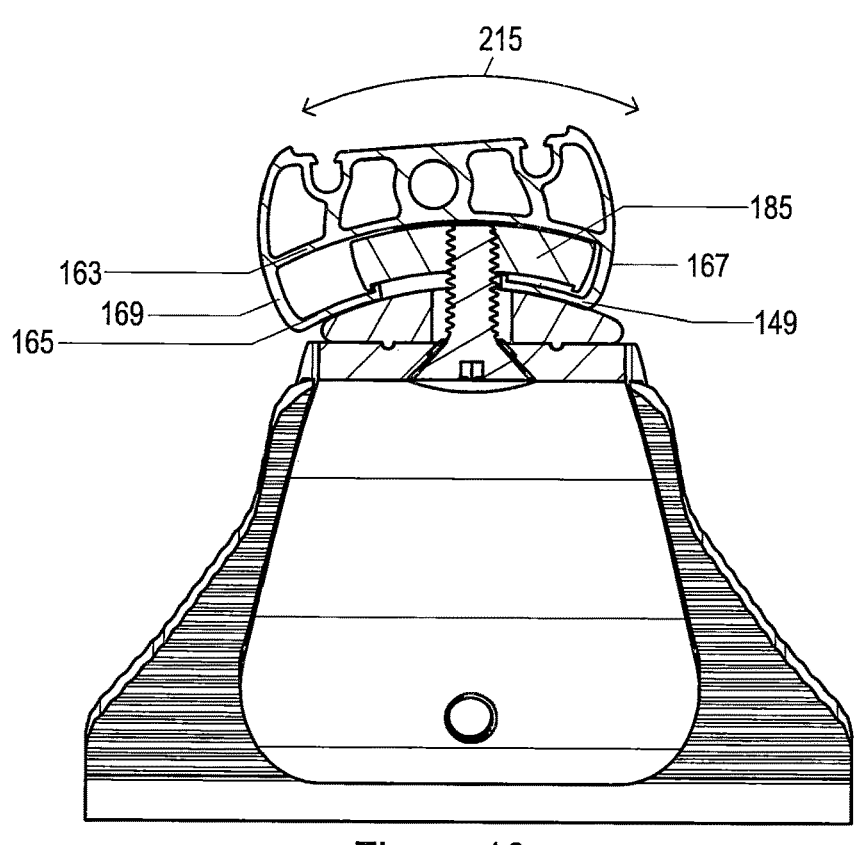
FIG. 10a is a right side view of an adjustable cross bar mount and a right side internal view of an adjustable cross bar of the present invention with the adjustable cross bar pivoted to an aft position.
Figure 10B:
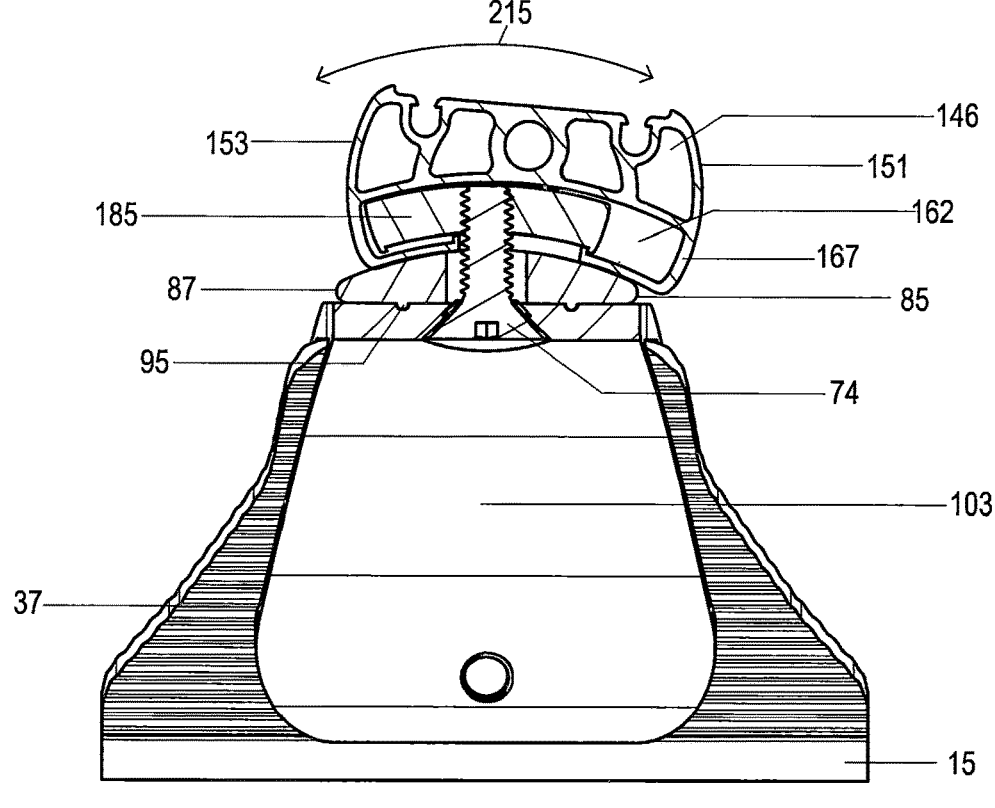
FIG. 10b is a right side view of an adjustable cross bar mount and a right side internal view of an adjustable cross bar of the present invention with the adjustable cross bar pivoted to fore position.
Figure 11:
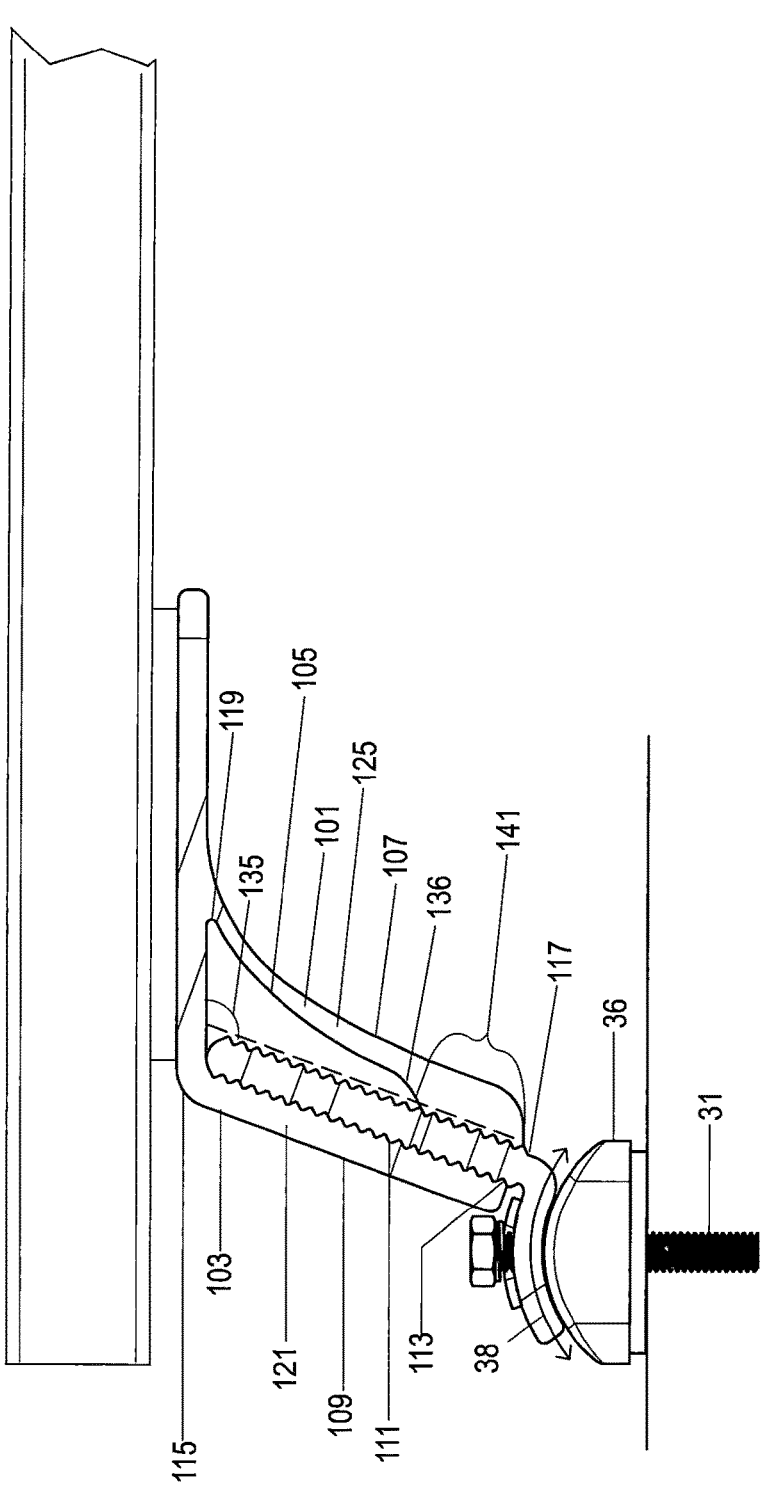
FIG. 11 is a side external view of a section of an adjustable cross bar of the present invention and a side internal view of an adjustable cross bar mount of the present invention having a roof engagement section with a curved lower portion mounted upon an elongated adjustment bushing.

In certain alternate preferred embodiments, as shown in FIG. 10, the bottom surface of the lower portion of the roof attachment section may be formed and shaped as a curved tab having a concave bottom surface. Such a shape enables the concave bottom surface 22 of the lower portion 17 to mate and pivot upon the convex top surface of an elongated adjustment bushing 36 utilized in such embodiments. The elongated adjustment bushing is formed in a rectangular shape with its long axis running parallel to the longitudinal axis of a vehicle roof upon which it is placed. The elongated adjustment bushing is also configured to demonstrate a convex top surface and flat bottom surface. The convex top surface of the elongated adjustment bushing mates with the concave bottom surface 22 of the lower portion of the adjustable roof mount. This configuration allows the roof mount to pivot along an inboard/outboard arc 38. Pivoting the roof mount in this fashion enables the adjustable roof mount to correct for inboard/outboard roof slope at the point of mount attachment to the vehicle roof. As discussed above, it is common for roof mounting features to be in a linear arrangement and located adjacent to the right and left peripheral margins of a vehicle's roof. In certain instances, this peripheral area slopes downward in an outboard direction. Attaching opposing (right and left) roof mounts to these areas without the aforementioned curved bottom portion and elongated adjustment bushing would cause the mounts to tilt outboard. This outboard tilt would make it impossible to mount an adjustable cross bar between these two, misaligned opposing roof mounts. The combination of a concave bottom surface (of the lower portion of the adjustable roof mounts) and the convex top surface of the elongated adjustment bushing enables the adjustable roof mounts of the present invention to be tilted inboard and made parallel in such circumstances. The square shape of the fore 24 and aft 28 enables sufficient inboard/outboard clearance for roof mount fasteners such as machine screws 31 securing the mount to a vehicle roof so as to allow the mount to pivot in an inboard/outboard manner 38.

Figure 4A:
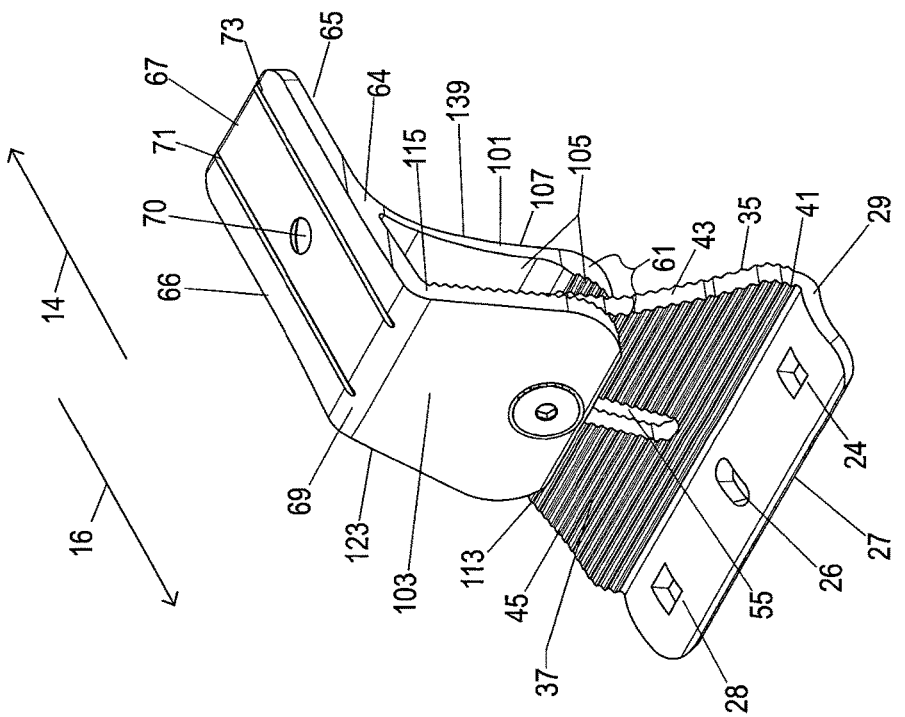
FIG. 4a is a top right isometric view illustrating an adjustable cross bar mount of the present invention adjusted to a high position.
Figure 5:
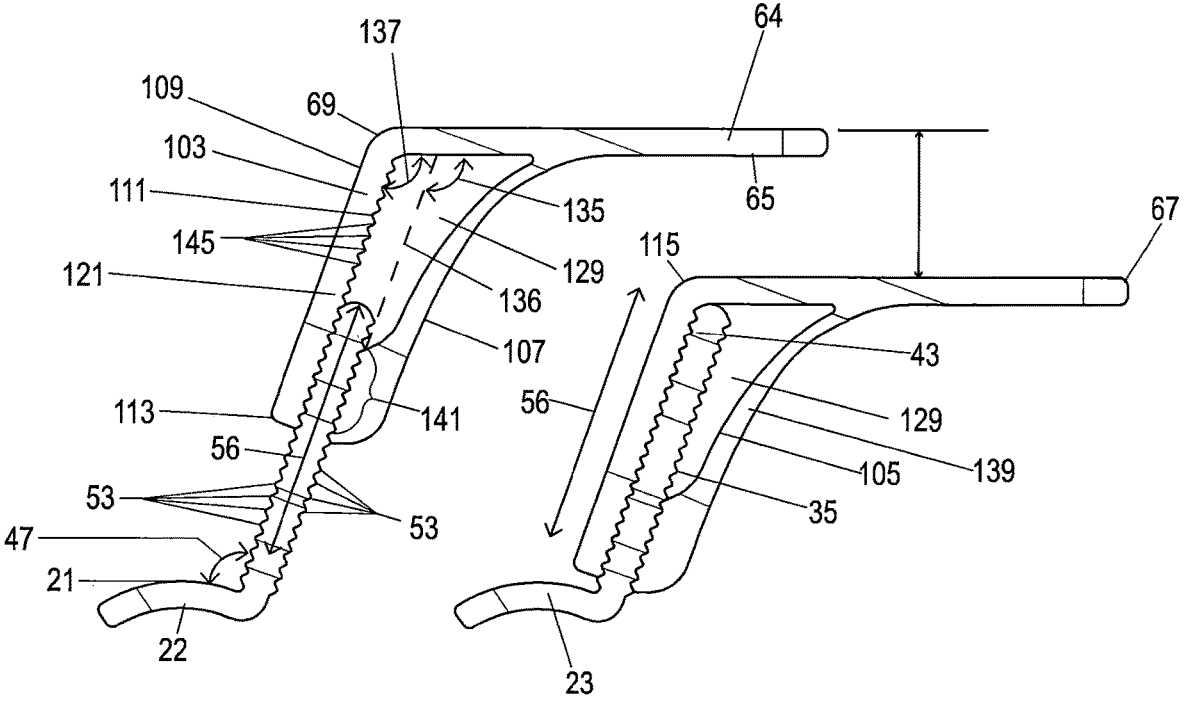
FIG. 5 is a side view of the adjustable cross bar mounts illustrated in FIGS. 4a and 4b.

The upper portion 57 of the roof attachment section arises from, and is continuous with the inboard end 29 of the lower portion 15. The upper portion is best described as a vertically disposed plate arising from the lower portion of the roof attachment section. The upper portion of the roof attachment section includes an inboard surface 35, an outboard surface 37, a superior end 39, an inferior end 41, a fore edge 43 and an aft edge 45. The upper portion of the roof attachment section also includes a longitudinal axis running midway between and parallel to the fore and aft edges thereof. (See FIGS. 3 and 4a) It is preferred that, as viewed with the bottom surface 22 of the lower portion of the roof attachment section affixed to a vehicle's roof, the upper portion 57 extends upward and slightly inboard relative to the surface of a vehicle's roof. More specifically, it is preferred that the angle 47 formed at the outboard intersection of the upper and lower portions of the roof attachment section, is from 100 to 120 degrees. It is further preferred that this angle be 110 degrees. The fore/aft width of the upper portion of the roof attachment section varies in certain preferred embodiments. In such embodiments, the width of the upper portion of the roof attachment section at the inferior end, adjacent to its intersection with the lower portion, is greatest. In such embodiments, the width of the upper portion of the roof attachment section diminishes toward the superior end. (See FIG. 5)

In preferred embodiments of the present invention, the entire inboard and outboard surfaces of the upper portion of the roof attachment section include horizontal ribs and grooves 53 traversing the complete width and running from the inferior to superior end of the upper portion. In addition, a vertical height adjustment slot 55 is located at and runs along the longitudinal center of the upper portion of the roof attachment section. It can also be described as running midway between the fore and aft edges of the vertically disposed plate. The vertical height adjustment slot is so located in order to align with the assembly bores formed within the inboard 101 and outboard plates 103 bordering the roof attachment capture slot, and allow adjustment of the height of the adjustable roof mount, discussed below. (See FIGS. 3, 4a and 4b)

The cross bar attachment section 57 of the adjustable cross bar mount comprises a cross bar support 59 and a roof attachment section capture flange 61. A cross bar alignment bushing 75, a cross bar insert 185 and fasteners, discussed below, are utilized to attach the cross bar support 59 to the adjustable cross bar. In preferred embodiments, the cross bar support is formed as a rectangular plate having a top surface 63, a bottom surface 65, an inboard end 67, an outboard end 69 an aft edge 66 and a fore edge 64. Two longitudinally aligned grooves (71 & 73), are formed within the top surface of the cross bar support. One longitudinal groove 71 is located adjacent to the aft edge 66 of the cross bar support while the second longitudinal groove 73 is located adjacent to the fore edge 64 of the support. These alignment grooves run from the inboard end 67 to the outboard end 69 of the cross bar support. (See FIGS. 3, 4a and 4b)

Figure 7:
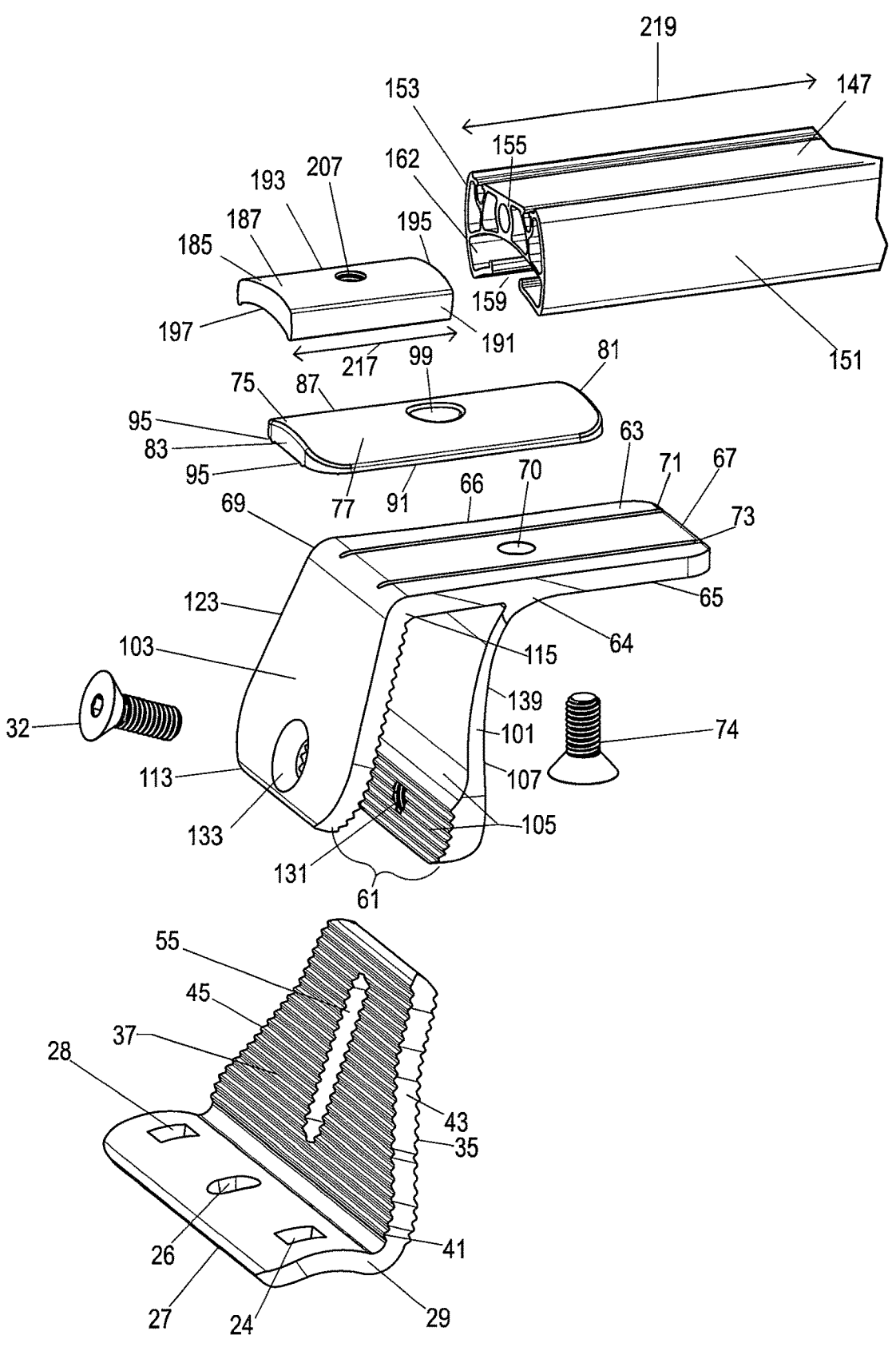
FIG. 7 is a top right isometric exploded view of an adjustable cross bar mount and a section of an adjustable cross bar of the present invention.
Figure 8:
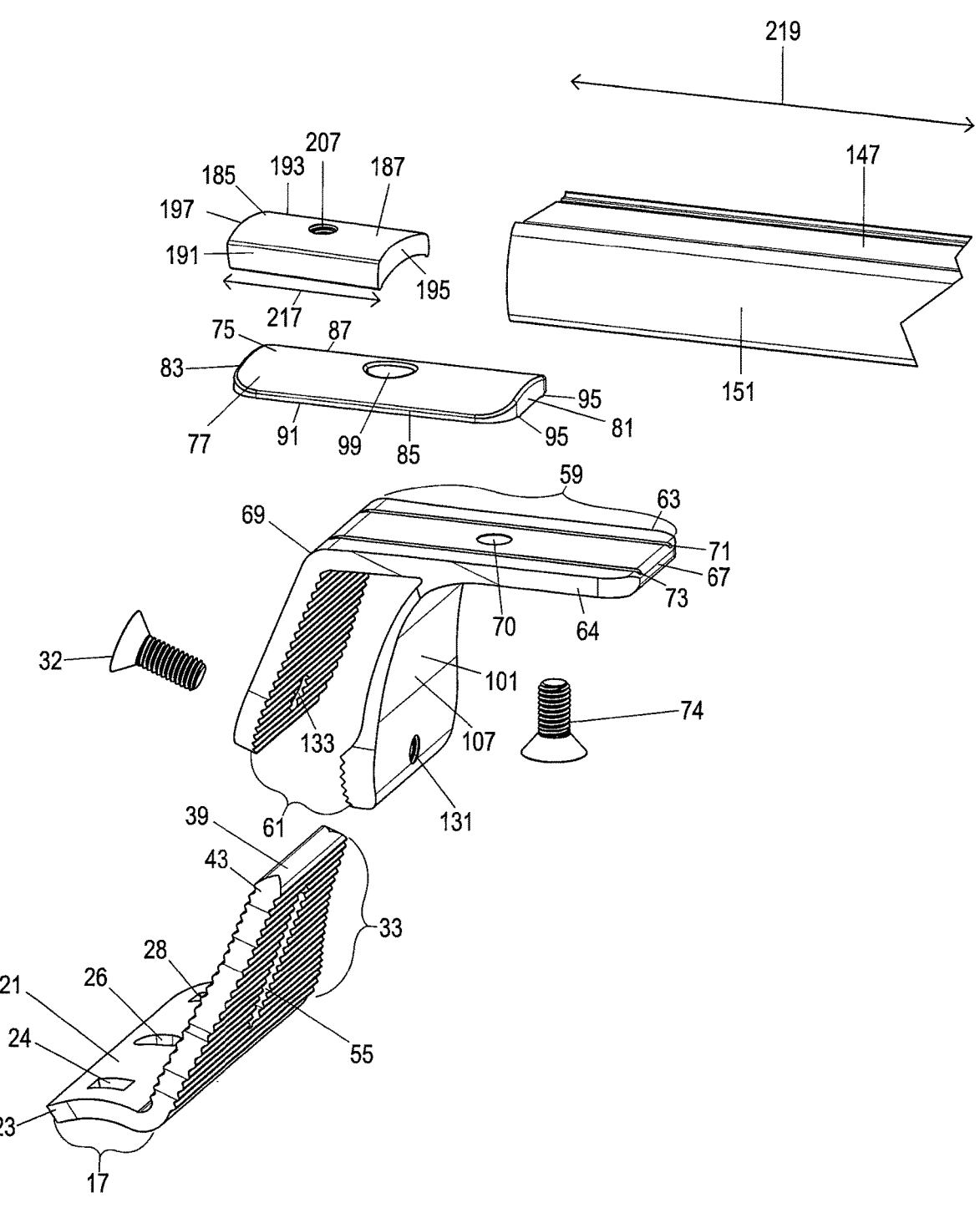
FIG. 8 is a top left isometric exploded view of the adjustable cross bar mount and a section of an adjustable cross bar of the present invention illustrated in FIG. 7b.

As mentioned above, the cross bar alignment bushing 75 of the present invention provides, in part, adjustment of the position of the adjustable cross bar. The cross bar alignment bushing includes a top surface 77, a bottom surface 79 an inboard end 81, an outboard end 83, a fore edge 85 and an aft edge 87. It is preferred that the cross bar alignment bushing be shaped in a rectangular shape wherein the top surface is convex and the bottom surface 91 is flat. The convex top surface of the alignment bushing has an radius of curvature equal to that of the concave bottom surface of the cross bar, discussed below. In addition, it is preferred that the bottom surface of the cross bar alignment bushing includes two longitudinally aligned ribs 95. One longitudinal rib is located adjacent to the fore edge of the alignment bushing, and the second bushing located adjacent to the aft edge of the alignment bushing. These longitudinally aligned ribs are especially shaped and configured to closely mate with the longitudinal alignment grooves (71 & 73) formed within the top surface of the cross bar support. The longitudinally aligned ribs act to maintain the cross bar alignment bushing properly aligned upon the cross bar support so that the longitudinal axis of the alignment bushing and the longitudinal axis of the cross bar support remained aligned. A cross bar attachment bore 70 is located medially, between these longitudinal alignment grooves and midway between the inboard and outboard ends of the cross bar support. A corresponding bushing bore 99 is formed through the cross bar alignment bushing. The bushing bore is centrally positioned between the fore 85 and aft 87 edges of the bushing and centrally between the inboard and outboard ends of the bushing. The bore is shaped and positioned for alignment with the cross bar attachment bore 70. (See FIGS. 3, 7 and 8)

The roof attachment section capture flange 61 includes and is formed by an inboard plate 101 and an outboard plate 103. The inboard plate includes an outboard surface 105, an inboard surface 107, an inferior end 117, a superior end 119, a fore edge 125 and an aft edge. Likewise, the outboard plate includes an outboard surface 109, an inboard surface 111, an inferior end 113, a superior end 115, a fore edge 121 and an aft edge 123. The outboard plate arises from the outboard end of the cross bar support and the inboard plate arises from the bottom surface of the cross bar support. The inboard and outboard plates form the borders of the roof attachment section capture slot 129. The roof attachment section capture slot is the space between the inboard and outboard plates. These plates are located and positioned so as to enable entry, adjustment and firm attachment of the upper portion of the roof attachment section within the slot. The distance between the plates is especially arranged so that, although the upper portion of the roof attachment section can be positioned within the roof attachment section capture slot, the space is easily closed to provide firm capture of the upper portion, as described, in detail, below. (See FIGS. 3 and 5) Each of the inboard and outboard plates of the roof attachment section capture flange includes an assembly bore. The bores are located adjacent to the inferior ends of the plates and midway between the fore and aft edges thereof. It is preferred that the bore formed through the inboard plate be a threaded bore configured to mate with an assembly screw while the bore formed within the outboard plate be a smooth bore 133. (See FIGS. 7 and 8)

The inboard plate originates and extends downward and outboard from the bottom surface of the cross bar support. The outboard plate originates from the outboard end of the cross bar support and also extends downward and outward in relation to the cross bar support. It is preferred that the inboard and outboard plate of the roof attachment section capture flange originate from the cross bar support at an angle of from 100 degrees to 120 degrees. It is further preferred that they arise from the cross bar support at an angle of 110 degrees. It is especially preferred that the inboard and outboard plates which form the roof attachment section capture flange originate from the cross bar support at equal angles (137,135). (See FIGS. 5 and 10)

In preferred embodiments of the present invention, the inboard and outboard plates are flat plates, devoid of curvature. It is further preferred that the inboard plate arises from the bottom surface of the cross bar support in a curved, rather than straight form. The curved configuration enables the inboard plate to arise further inboard along the cross bar support so as to provide greater stability to the adjustable cross bar. In such embodiments, the curved portion 139 of the inboard plate does not include the horizontal grooves and ribs on the inboard surface. In preferred embodiments incorporating an inboard plate having a curved portion, another portion of the inboard plate, adjacent to the inferior end there, is formed in a straight configuration, devoid of curvature. (See FIGS. 4a and 5) The outboard surface of this straight portion 141 of the inboard plate is especially shaped and configured to include horizontal ribs and grooves. The straight portion of inboard plate is disposed at the same angle relative to the bottom surface of the cross bar support as the outboard plate. This angle is determined by extending an imaginary line 136 which runs parallel to the straight portion of the inboard plate from the inferior end of the inboard plate to the superior end thereof. The inboard aspect of the angle 135 formed thereby (which is formed at the intersection of the imaginary line with the bottom surface of the cross bar support) is equal, in all embodiments, to the angle 137 formed between the inboard surface of the outboard plate and the outboard end of the cross bar support. (See FIG. 5)

The inboard surface of the outboard plate includes horizontally disposed ribs and grooves running from the fore to aft edge of the outboard plate. It is preferred that these horizontally disposed ribs and grooves also run from the inferior 113 to the superior 115 ends of the outboard plate.

The horizontal ribs and grooves 53 formed upon the inboard surface of the upper portion 33 of the roof attachment section and the horizontal grooves and ribs formed upon the outboard surfaces 105 of the inboard plate 101 of the roof attachment capture flange 61 are especially shaped and configured to tightly mate with one another upon engagement of an assembly fastener such as a machine screw, (discussed in more detail, below). In the same manner, the horizontal ribs and grooves 53 formed upon the outboard surface 37 of the upper portion 33 of the roof attachment section 15 and the horizontal grooves and ribs 145 formed upon the inboard surface 111 of the outboard plate 103 of the roof attachment section capture flange are also especially shaped and configured to tightly mate with one another upon tightening of the assembly fasteners.

Figures 6A, 6B:
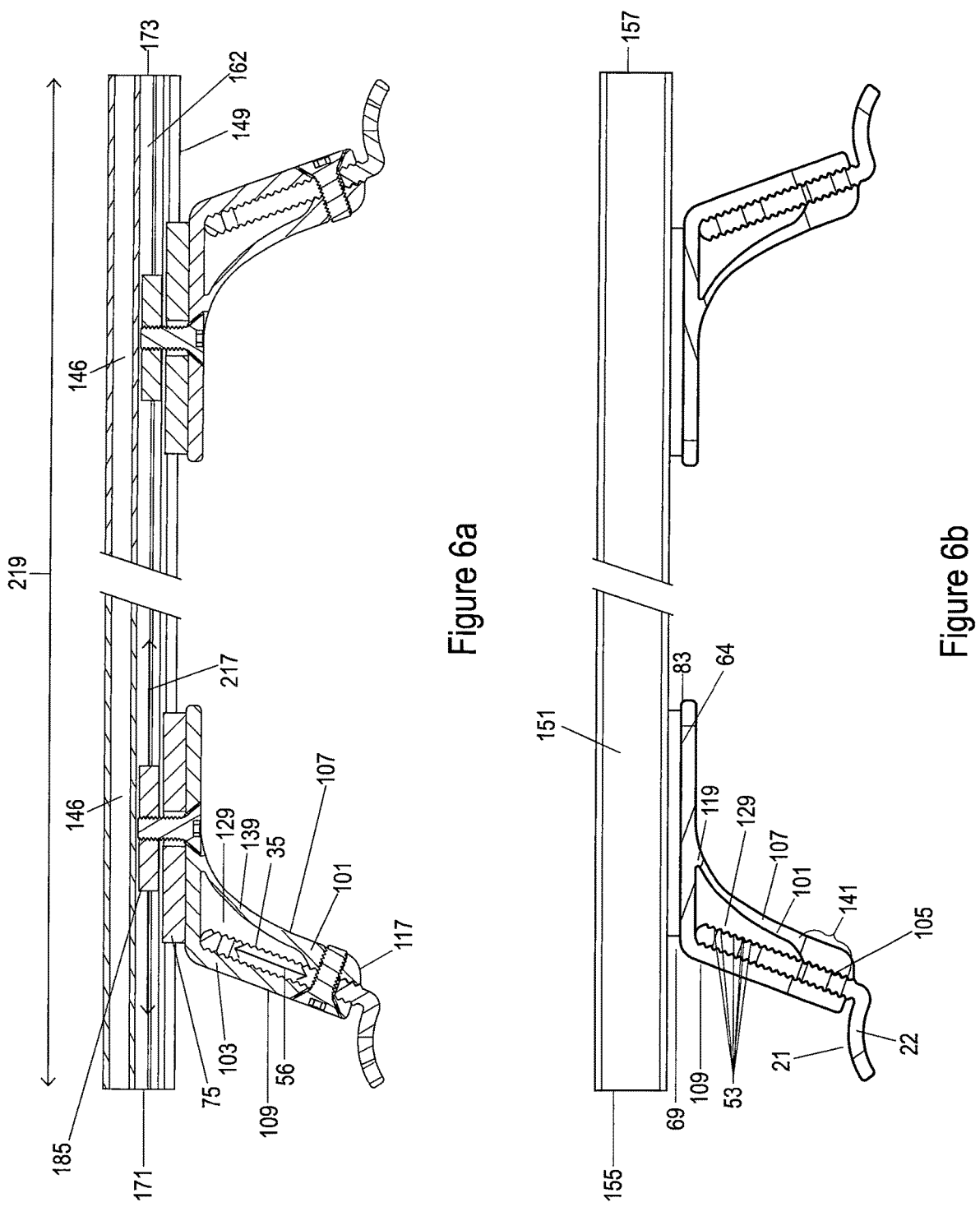
Figure 9:
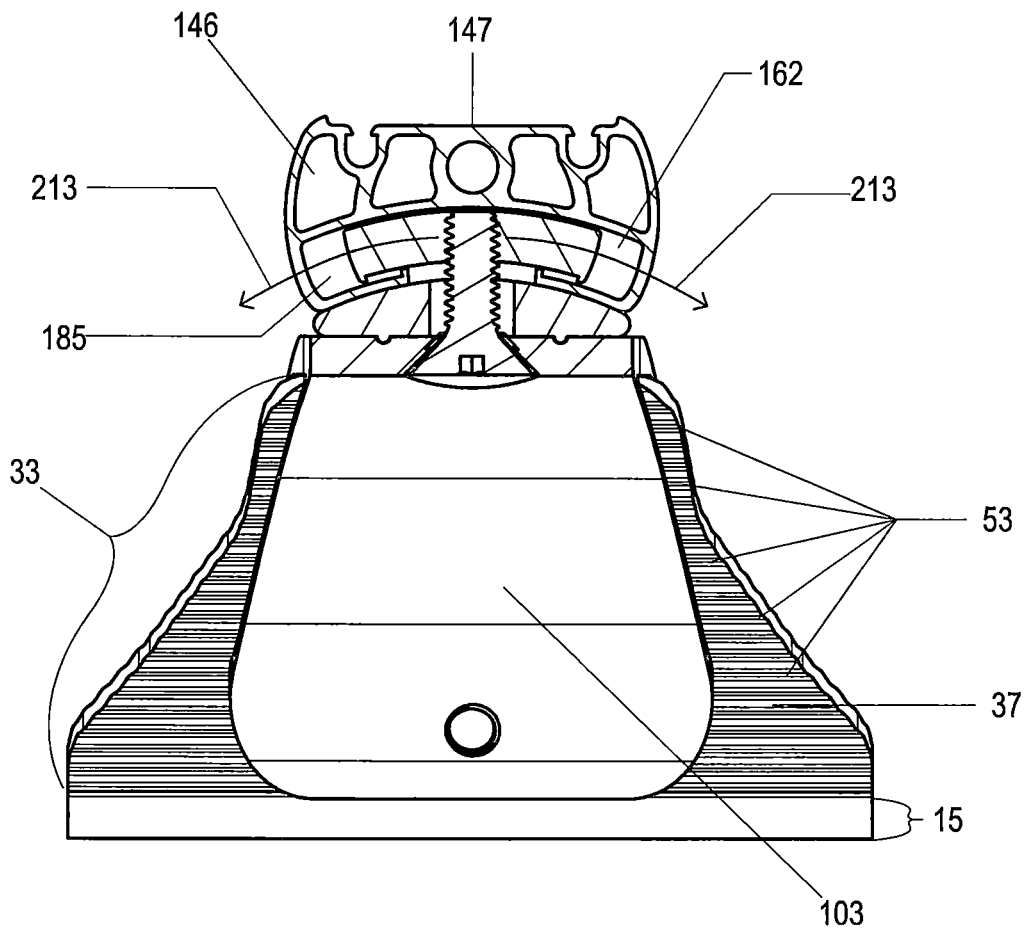
FIG. 9 is a right side view of an adjustable cross bar mount and a right side internal view of an adjustable cross bar of the present invention in a neutral fore/aft position.

The adjustable cross bar 146 of the present invention is, in preferred embodiments, formed as an elongated bar having a top surface 147, a bottom surface 149, a fore surface 151, an aft surface 153, a right end 155, and a left end 157. The adjustable cross bar is open at the right and left ends thereof. The adjustable cross bar has a length equal to the distance between the right and left ends thereof. The adjustable cross bar has a concave bottom surface with an adjustment slot 159 running longitudinally along the center of the bottom surface aligned with the longitudinal axis of the cross bar. The adjustment slot provides access to an insert channel 162 located within the lower portion of the cross bar. (See FIG. 7) The insert channel runs along the entire length of the adjustable cross bar and includes a top wall 163, a bottom wall 165, a fore wall 167, and an aft wall 169. (See FIG. 9a) The insert channel also includes an open right 171 and left 173 ends which are located below the openings at the right and left ends of the adjustable cross bar 146. (See FIG. 6a) The bottom wall of the insert channel is effectively divided into two equal portions by the adjustment slot 159. The top wall of the insert channel is concave while the bottom wall is convex. It is preferred that the top convex wall and bottom concave wall of the insert channel have the same radius of curvature. It is still further preferred that the convex top surface of the alignment bushing, the concave bottom surface of the adjustable cross bar, the convex bottom wall of the insert channel, the concave bottom surface of the cross bar insert, the convex top surface of the cross bar insert and the concave top wall of the insert channel all demonstrate the same radius of curvature (See FIGS. 8, 9a and 9b)

The right and left ends of the cross bar are open and continuous with the insert channel 162 so as to allow insertion and inboard/outboard adjustment 217 of the cross bar insert's position within the channel. As discussed below, the ability to adjust the inboard/outboard position of the cross bar insert within the insert channel enables the adjustable cross bar of the present invention also be adjusted in an inboard/outboard manner 219. (See FIG. 6a) In all embodiments, the cross bar insert channel runs the entire length of the cross bar. In preferred embodiments of the present invention, the cross bar insert channel is shaped and configured with sufficient width to enable the cross bar insert to be adjusted along a fore/aft arc 213 within the insert channel. For this purpose, the concave upper wall of the insert channel is shaped and configured to have a radius of curvature equal to the convex upper surface of the cross bar insert. The convex shape of the bottom wall of the insert channel is shaped and configured to have a radius of curvature equal to that of the concave shape of the bottom surface of the cross bar insert. By pivoting the cross bar insert along the aforementioned fore/aft arc, the cross bar is pivoted in an equal parallel arc 215. (See FIGS. 8, 9a and 9b)

Cross bar inserts, cross bar alignment bushings, cross bar inserts and fasteners are utilized in order to assemble the adjustable cross bar mount of the present invention and to mount the adjustable cross bar upon the adjustable cross bar mount. The cross bar insert 185 is formed and shaped as a curved rectangular bar having a top surface 187, a bottom surface 189, a fore surface 191, an aft surface 193, an inboard end 195, an outboard end 197, a width 199 and a longitudinal axis. (See FIGS. 3 and 7) The width of the cross bar insert is the distance from the fore to aft surface of the insert. The width of the insert channel is the distance from the fore wall to the aft wall of the channel. The top surface of the cross bar insert is convex while the bottom surface is concave. In preferred embodiments of the present invention, the radius of curvature of the top convex surface of the cross bar insert is equal to the radius of curvature of the bottom concave surface of the insert. The insert includes a threaded central bore 207. In preferred embodiments, while positioned within the cross bar insert channel 162, the convex top surface of the insert is closely adapted to lie upon and abut the concave top wall of the cross bar insert channel. The concave bottom surface of the insert closely mates with and lies upon the convex bottom wall of the insert channel. The concave bottom surface of the cross bar insert and the convex bottom wall of the insert channel and also demonstrate the same radius of curvature. In fact, it is preferred that the radius of curvature of the top wall of the insert channel, the top surface of the cross bar insert, the bottom surface of the cross bar insert, the bottom wall of the cross bar insert channel, the bottom surface of the cross bar, and the top surface of the cross bar bushing (discussed below), all be equal. It is preferred that the radius of curvature of all of the abovementioned surfaces be configured to be from 52 millimeters to 62 millimeters. It is still further preferred that the radius of curvature be 57 millimeters. In addition it is preferred that the width of the cross bar insert be less that the width of the insert channel so as to enable the above and below-described fore/aft pivoting of the cross bar insert within the cross bar insert channel. More specifically, it is preferred that the width of the insert be from 10 to 40 percent less that the width of the cross bar insert channel. It is still further preferred that the width of the cross bar insert be from 20 to 30 percent less than the width of the cross bar insert channel. The reduced width of the cross bar insert in comparison to the width of the cross bar insert channel enables a cross bar to be pivoted along a fore/aft arc 215, discussed in more detail, below. (See FIGS. 8, 9*a* and 9*b*) The fore/aft pivoting of the cross bar enabled by the above-described cross bar alignment bushing, cross bar insert and cross bar channel will be equal to the radius of curvature of these components.

The adjustable cross bar mount of the present invention is assembled from the combination of a roof attachment section 15 and a cross bar attachment section 57 by means of an assembly screw or other similar fastener. The adjustable cross bar mount may be assembled in the utilizing the following procedure: The upper portion of the roof attachment section 33 is first introduced into the roof attachment section capture slot 129 located between the inboard plate and an outboard plate of the roof attachment section capture flange 61. There is sufficient clearance to allow the upper portion of the roof attachment section to be inserted between the inboard 101 and outboard plate 103 (which form the roof attachment section capture slot). However, this space is easily closed by utilizing a roof mount assembly screw 32 and washer 34 to provide firm capture of the roof attachment section. (See FIG. 3) As mentioned above, in preferred embodiments, the entire inboard and outboard surfaces of the upper portion of the roof attachment section include horizontal ribs and grooves traversing their complete width running from the inferior to superior end of the upper portion. These horizontal ribs and grooves are shaped and configured to mate with corresponding grooves and ribs formed upon the inboard surface of the outboard plate and outboard surface of the inboard plate of the roof attachment section capture flange 61. Before the assembly screw is tightened within the threaded bore of the inboard plate, the upper portion of the roof attachment section can be moved up and down 56 within the roof attachment capture slot until a desired height position is attained. (See FIG. 5) More specifically, a machine screw 32 with a washer 34, is first introduced through the assembly bore 133 formed through the outboard plate of the roof attachment section capture slot. Thereafter, the machine screw or other suitable fastener is further introduced through the height adjustment slot 55 formed longitudinally and medially through the upper portion of the roof attachment section. Thereafter, the machine screw is introduced into the threaded assembly bore 131 formed within the inboard plate of the roof attachment section capture flange. Upon tightening of the machine screw, the horizontal ribs and grooves formed upon the inboard and outboard surfaces of the upper portion of the roof attachment section securely engage the horizontal ribs and grooves formed upon the outboard surface of the inboard plate and the inboard surface of the outboard plate of the roof attachment section capture flange. The cross bar attachment section is now affixed to the cross bar attachment section to form a fully assembled adjustable cross bar mount.

The roof mount of the present invention can be easily attached to roof mounting features formed or prepared upon a vehicle roof. For example, it is common for vehicles to have a linear arrangement of longitudinally aligned roof mounting features located adjacent the right and left margins of the vehicle's roof. Such mounting features may include, for example, smooth bores, threaded bores, mounting channels and flanges. Some vehicles may position such roof mounting features in pairs such as, for example, pairs of threaded or smooth mounting bores. Other vehicles may arrange mounting features as single threaded or smooth bores or single clip nuts. The cross bar mount of the present invention provides a lower portion of the roof attachment having two, and in preferred embodiments, three bores for engagement of such roof features. It is preferred to configure the fore bore 24 and aft bore 28 of the lower portion of the roof attachment section in a square shape so as to allow for some inconsistencies in distances between paired roof features. The central bore, 26 is preferably shaped as an elongated bore running perpendicular to the longitudinal axis of the lower portion of the roof attachment section. Fasteners, such as machine screws, self-tapping screws, nuts, bolts and washers can be utilized to affix the roof attachment section of the present invention to a vehicle roof.

Figure 3:
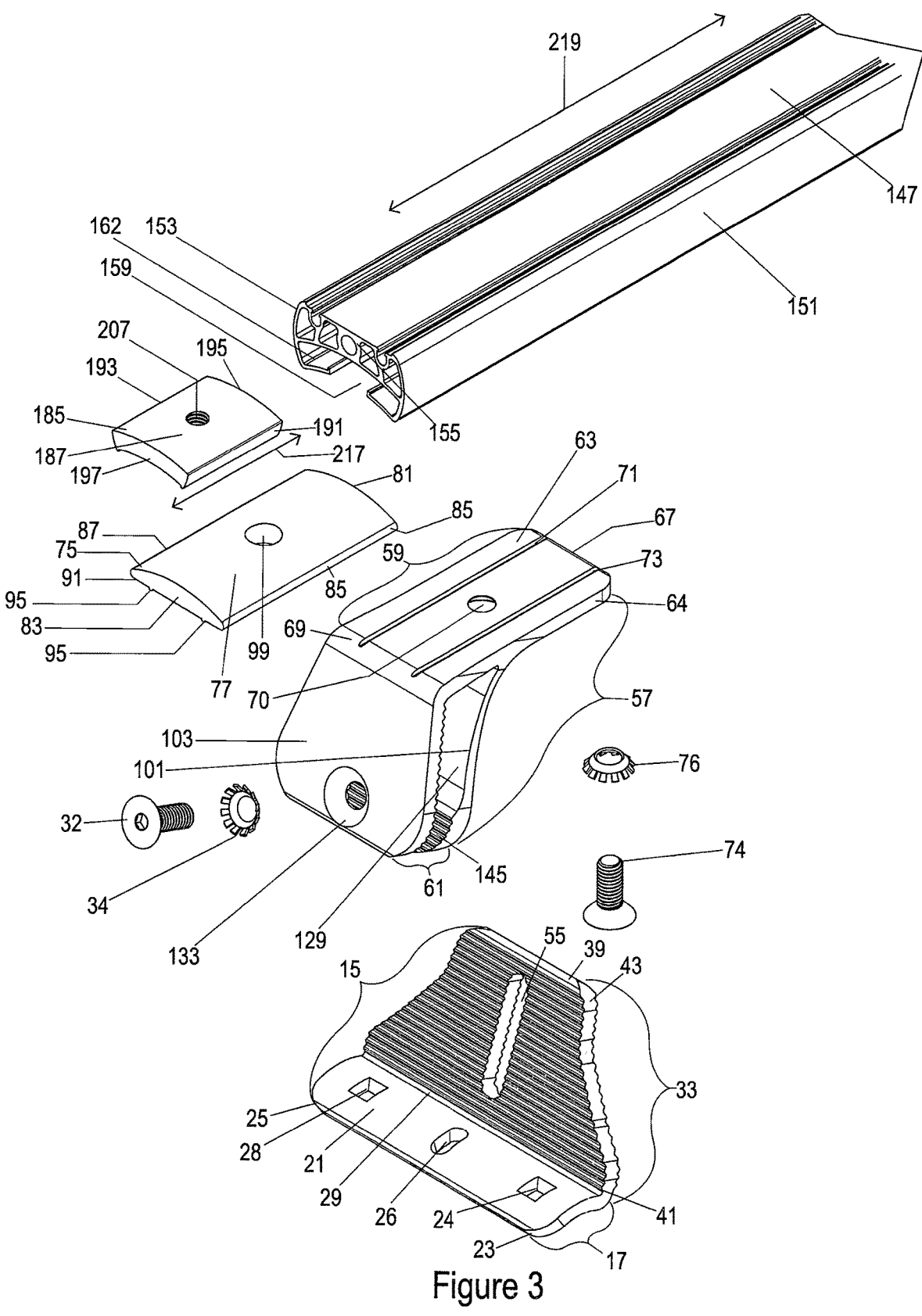
FIG. 3 is a top right exploded isometric view of an adjustable cross bar mount and a section of an adjustable cross bar of the present invention
Figure 4B:
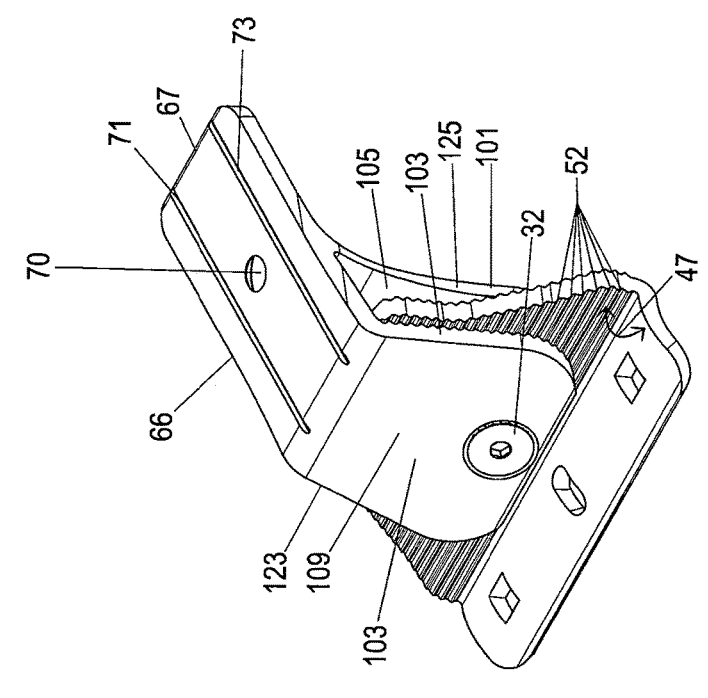
FIG. 4b shows the adjustable cross bar mount illustrated in FIG. 4b in a lower position.

In order to mount an adjustable cross bar 146 to a vehicle roof, two, opposing (right and left) assembled adjustable cross bar mounts are required. FIG. 3 illustrates 3 adjustable cross bars of the present invention mounted upon 3 fully assembled adjustable cross bar mounts. The cross bar mounts are, in turn, mounted to the vehicle roof. The term "assembled adjustable cross bar mounts" as well as "fully assembled adjustable cross bar mounts" as used throughout this specification and claims refers to a cross bar mount wherein the roof attachment section and the cross bar attachment section have been joined with a fastener as described above. In mounting an adjustable cross bar to a vehicle roof, a first assembled adjustable cross bar mount of the present invention is affixed to a roof attachment feature located adjacent the right side or left side of a vehicle roof. Thereafter, a second assembled adjustable roof mount is attached to a roof attachment feature located adjacent the opposite side of the vehicle roof in a fore/aft position directly opposite the first adjustable mount. Thereafter, a cross bar alignment bushing 75 is placed upon the top surface 63 of the cross bar support of both the right and left (opposing) cross bar mounts. The cross bar alignment bushings are positioned so that the longitudinal ribs 95 formed upon the bottom surface of the alignment bushings fit within the longitudinal grooves (71 & 73) formed on the top surfaces of the cross bar supports upon which they are placed. In addition, the bushings are placed upon the cross bar supports so that the attachment bore 70 formed through the cross bar support is aligned with the bushing bore 99 formed through the cross bar alignment bushing. (See FIGS. 3, 7 and 8)

After the above-described placement of cross bar alignment bushings upon cross bar supports of opposing cross bar mounts, a cross bar insert is introduced through the right 155 and left 157 end of the cross bar insert into the cross bar insert channel 162. The cross bar insert is oriented within the cross bar insert channel so that the convex top surface of the insert is placed against the upper concave wall of the insert channel. The bottom concave surface of the insert is placed against the lower convex wall of the insert channel. A machine screw is then introduced through the bottom surface of both cross bar supports through the attachment bore. The machine screw is then further inserted through the bushing bore of the alignment bushing. The machine screw is then further introduced through the longitudinal adjustment groove 159 formed centrally, along through the bottom wall of the insert channel so as to engage the threaded central bore of the cross bar insert. The attachment bore 70 formed through the cross bar support and the alignment bushing bore 99 are both smooth bores allowing unobstructed passage of fasteners such as a machine screw 74 and washer 76.

Upon initial introduction of a machine screw into the threaded bore of the cross bar insert, the screw is not fully tightened. This allows the cross bar insert to easily move in a fore/aft direction 216 within the insert channel. The fore/aft position 219 of the cross bar upon the vehicle roof can now be adjusted until the cross bars are centered upon the vehicle roof. In this position, a center point located half way between the right and left ends of the cross bar will be aligned with the longitudinal center of a vehicle roof upon which the cross bar is mounted. (See FIG. 7) Thereafter, by tightening the machine screw, the concave bottom of the cross bar insert will be forced tightly against the convex bottom surface of the insert channel while the convex top surface of the alignment bushing will tighten against the concave bottom surface of the cross bar. Simultaneously, the flat bottom surface of the cross bar alignment bushing will become securely affixed to the cross bar support in order to firmly engage and fix the position of the cross bar. At this point, it is possible to adjust the height of the cross bar above the vehicle roof upon which it is mounted. For this purpose the assembly fastener, such as a machine screw and washer, which has affixed the roof attachment section to the cross bar attachment section of the opposing cross bar mounts may be loosened. This allows the cross bar attachment section to be raised or lowered in relation to the roof attachment section which is fixed in position (mounted upon a vehicle mounting feature) utilizing the vertical height adjustment slot 55. This adjustment, in turn, enables the height of the cross bar, now attached to the cross bar attachment section of the cross bar mount, to be adjusted as desired. Tightening of the assembly screw after such adjustment will fix the cross bar at the desired height.

If, upon centering the adjustable cross bar on a vehicle's roof, the right and left ends of the cross bar extend beyond the right and left peripheral margins of the roof, it is possible to cut the cross bar to a desired length. As discussed below, the adjustable cross bars of the present invention have a continuous, uniform, cross sectional configuration. Therefore, the cross bar insert channel, as well as the adjustment slot communicating therewith, runs the entire length of the cross bar. This continuous uniform cross sectional configuration allows the adjustable cross bars of the present invention to be cut to any desired length and thereafter be mounted upon the adjustable cross bar mount in the same manner as discussed above.

In certain situations, there can be a need to adjust the adjustable cross bar in order to correct for a fore/aft slope of a vehicle roof. For this purpose, the adjustable cross bar mount and adjustable cross bar of the present invention enables the cross bar to be pivoted along a fore/aft arc 215. As mentioned above, the fore/aft width of the insert channel (distance from fore to aft insert channel wall) is greater than the width of the cross bar insert (distance from the fore to aft surface of the cross bar insert). As mentioned above, the top wall 163 of the insert channel is concave while the bottom wall 165 of the insert channel is convex. The insert, conversely, has a convex top surface 187 and a concave bottom surface 189. Prior to tightening fasteners such as machine screws that secure the adjustable cross bar to the cross bar attachment section of two opposing cross bar mounts, the cross bar may be pivoted along a fore/aft arc 215. More specifically, prior to firmly tightening a machine screw that has engaged the threaded bore of the cross bar insert within the cross bar insert channel, the curved surfaces of the insert, insert channel, bottom surface of the cross bar and top surface of the cross bar alignment bushing enable such pivoting. The greater width of the cross bar insert channel compared to the lesser width of the cross bar insert 185 enables a pivoting movement of the cross bar insert along a fore/aft arc 213. In preferred embodiments, the arc of movement of this pivot is identical to the radius of curvature of the top and bottom walls of the insert channel, the top and bottom surfaces of the cross bar insert and the top surface of the cross bar adjustment bushing. In instances, after pivoting a cross bar to a desired position along this arc, tightening of the cross bar attachment screw into the threaded bore of the cross bar insert will fix the cross bar in this position. (See FIGS. 8, 9*a* and 9*b*)

As mentioned above, the adjustable cross bar of the present invention has a continuous cross sectional configuration. Beyond simply having uniform external shape and dimension, the internal configuration of the adjustable cross bar is constant and uniform through its entire length. Thus, the shape, dimensions and configurations of internal features such as the adjustment slot, the insert channel, the concave bottom surfaces of the cross bar are all continuous throughout the entire length of the cross bar. This continuous cross sectional configuration enables the adjustable cross bar of the present invention to be cut at any desired length so as to traverse the distance between opposing (right and left) adjustable cross bar mounts on roofs of varying widths. The adjustable cross bar can therefore be customized as to length for a precise fit on varying vehicle roof widths.

The high strength adjustable cross bar cargo carrier bar of the present invention provides increased weight bearing capacity by substantially increasing the surface area of those surfaces utilized which are subject to and bear such weight. These areas comprise the inboard and outboard surfaces of the upper portion of the roof attachment section as well as the outboard surface of the inboard plate and inboard surface of the outboard plate. More specifically, the assembly machine screw or bolt, for example, utilized to maintain the height of a cross bar mounted upon the roof mount, is not, in fact, a load-bearing component. None of the fasteners utilized in the present invention are weight bearing. The machine screw is utilized to affix the roof attachment section to the cross bar attachment section only. It does not bear the weight carried by a cross bar. Instead, it causes the horizontal ribs and grooves formed upon the inboard and outboard surfaces of the upper portion of the roof attachment section to engage the horizontal ribs and grooves formed within the roof attachment section capture flange. Thus, the weight of a load placed upon the cross bar attached to such mounts is carried by numerous grooves and ridges having many times the surface area of a bolt, rivet or screw.

I claim:

1. A high strength automotive cross bar cargo carrier comprising a plurality of: adjustable cross bar mounts, adjustable cross bars, cross bar alignment bushings, cross bar inserts and fasteners, wherein:

the adjustable cross bar mounts each include a roof attachment section and a cross bar attachment section; the roof attachment section having an upper portion and a lower portion wherein;

the lower portion of the roof attachment section is shaped and configured as a rectangular tab having a top surface, a bottom surface, a fore end, an aft end, an inboard end and an outboard end, the bottom surface of the lower portion is shaped and configured for placement upon the surface of a vehicle roof and includes at least two roof attachment bores;

the upper portion of the roof attachment section is shaped and configured as a vertically disposed plate having an inboard surface, an outboard surface, a fore edge, an aft edge, a superior end, an inferior end and a width, the upper section including a longitudinal axis, the inboard and outboard surfaces of the upper portion having horizontal ribs and grooves formed thereupon running from the fore to aft edges, the upper portion also includes a vertical height adjustment slot located midway between the fore and aft edges thereof;

the cross bar attachment section includes a roof attachment section capture flange and a cross bar support; wherein the roof attachment section capture flange includes an inboard plate and an outboard plate, both the inboard and outboard plates having an inboard surface, an outboard surface, an inferior end, a superior end, a fore edge and an aft edge, the inboard surface of the outboard plate and the outboard surface of the inboard plate having horizontally disposed ribs and grooves running from the fore edges to the aft edges thereof especially shaped and configured for engagement of the horizontal ribs and grooves formed on the inboard and outboard surfaces of the vertically disposed plate of the upper portion of the roof attachment section thereby enabling capture and retention of the vertically disposed plate within a roof engagement section capture slot at a selected height, the inboard and outboard plates each having assembly bores formed therethrough;

the cross bar support is formed as a rectangular plate having a top surface, a bottom surface, an inboard end, an outboard end, a fore edge and an aft edge, the top surface of the cross bar support including two longitudinally aligned grooves running from the inboard end to the outboard end thereof, the cross bar support also including a cross bar attachment bore;

each of the adjustable cross bars is formed in the shape of an elongated bar having a top surface, a bottom surface, a fore surface, an aft surface, a right end, a left end and a length, the bottom surface of the adjustable cross bar being concave and including a longitudinal adjustment slot running longitudinally and medially along the bottom surface that communicates with a cross bar insert channel formed within a lower portion of the cross bar, wherein positioning of each of the adjustable cross bars can be adjusted along a fore/aft arc and in an inboard/outboard direction;

each of the cross bar alignment bushings are formed and shaped as a rectangular bar having a convex top surface, a flat bottom surface, an inboard end, an outboard end, a fore edge and an aft edge, the bottom surface including two longitudinally aligned ribs located adjacent the fore and aft edges thereof, each of the alignment bushings also including a bushing bore located centrally between the fore and aft edges thereof;

each of the cross bar inserts are shaped and configured as a curved rectangular bar having a convex top surface, a concave bottom surface, a fore surface, an aft surface, an inboard end, an outboard end, a width and a longitudinal axis, wherein each of the cross bar inserts includes a threaded central bore.

2. The high strength automotive cross bar cargo carrier of claim 1 wherein the lower portion of the roof attachment section includes a fore bore and an aft bore.

3. The high strength automotive cross bar cargo carrier of claim 2 wherein the fore bore and the aft bore of the lower portion of the roof attachment section are square in shape.

4. The high strength automotive cross bar cargo carrier of claim 1 wherein the lower portion of the roof attachment section includes a fore bore, a central bore and an aft bore.

5. The high strength automotive cross bar cargo carrier of claim 2 wherein the lower portion of the roof attachment section is shaped and configured as a curved tab having a concave bottom surface.

6. The high strength automotive cross bar cargo carrier of claim 5 further comprising an elongated adjustment bushing having a convex top surface and a flat bottom surface.

7. The high strength automotive cross bar cargo carrier of claim 6 wherein the adjustable cross bar mount can be pivoted along an inboard/outboard arc.

8. The high strength automotive cross bar cargo carrier of claim 1 wherein the upper portion of the roof attachment section arises from and intersects the inboard end of the lower portion of the roof attachment section and the angle formed at said intersection is from 100 to 120 degrees.

9. The high strength automotive cross bar cargo carrier of claim 8 wherein the angle formed at the intersection of the upper and lower portions of the roof attachment section is 110 degrees.

10. The high strength automotive cross bar cargo carrier of claim 1 wherein the assembly bore formed in the inboard plate of the roof attachment section capture flange is a threaded bore.

11. The high strength automotive cross bar cargo carrier of claim 1 wherein the inboard and outboard plates of the roof attachment section capture flange both extend downward and outboard from the cross bar support at an angle of from 100 to 120 degrees.

12. The high strength automotive cross bar cargo carrier of claim 1 wherein the inboard and outboard plates of the roof attachment section capture flange both extend downward and outboard from the cross bar support at an angle of 110 degrees.

13. The high strength automotive cross bar cargo carrier of claim 1 wherein the inboard plate of the roof attachment section capture flange includes a curved portion adjacent to the superior end thereof devoid of horizontal grooves and ribs and a straight portion adjacent the inferior end of the inboard plate having grooves and ribs formed on the outboard surfaced thereof.

14. The high strength automotive cross bar cargo carrier of claim 13 wherein the outboard plate extends downward and outboard from the cross bar support so as to originate from the cross bar support at an angle of from about 100 to 120 degrees and wherein an imaginary line running parallel to the straight section of the inboard plate, intersects the bottom surface of the cross bar support at the same angle as the outboard plate extends downward and outward from the cross bar support.

15. The high strength automotive cross bar cargo carrier of claim 1 wherein each of the adjustable cross bars demonstrates a continuous cross sectional configuration from the right to left end thereof wherein the attachment slot, the insert channel and the concave bottom surfaces of the cross bar are all continuous in form, shape and configuration throughout the entire length of the cross bar.

16. The high strength automotive cross bar cargo carrier of claim 15 wherein the insert channel includes a top wall, a bottom wall, a fore wall an aft wall and a width and wherein the bottom wall of the insert channel is divided into two equal portions by the attachment slot, the top wall of the insert channel being concave and the bottom wall of the insert channel being convex in shape.

17. The high strength automotive cross bar cargo carrier of claim 16 wherein the width of the insert channel is greater than the width of the cross bar insert.

18. The high strength automotive cross bar cargo carrier of claim 17 wherein the width of the insert channel is from 10 to 40 percent greater than the width of the cross bar insert.

19. The high strength automotive cross bar cargo carrier of claim 18 wherein the width of the insert channel is 25 percent greater than the width of the cross bar insert.

20. The high strength automotive cross bar cargo carrier of claim 19 wherein the bottom and top walls of the cross bar insert channel have the same radius of curvature.

21. The high strength automotive cross bar cargo carrier of claim 20 wherein the top wall of the insert channel, the top surface of the cross bar insert, the bottom surface of cross bar insert, the bottom wall of the insert channel, the bottom surface of cross bar and the top surface of alignment bushing all demonstrate the same radius of curvature of from 52 millimeters to 62 millimeters.

22. The high strength automotive cross bar cargo carrier of claim 21 wherein the top wall of the insert channel, the top surface of the cross bar insert, the bottom surface of cross bar insert, the bottom wall of the insert channel, the bottom surface of cross bar and the top surface of alignment bushing all demonstrate the same radius of curvature of 57 millimeters.

\* \* \* \* \*

24